United States Patent
Fu et al.

(10) Patent No.: US 10,070,438 B2
(45) Date of Patent: Sep. 4, 2018

(54) SOFT BUFFER PROCESSING METHOD AND APPARATUS

(71) Applicant: Samsung Electronics Co., Ltd, Gyeonggi-do (KR)

(72) Inventors: Jingxing Fu, Beijing (CN); Shichang Zhang, Beijing (CN); Yingyang Li, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 15/314,920

(22) PCT Filed: May 29, 2015

(86) PCT No.: PCT/KR2015/005445
§ 371 (c)(1),
(2) Date: Nov. 29, 2016

(87) PCT Pub. No.: WO2015/183051
PCT Pub. Date: Dec. 3, 2015

(65) Prior Publication Data
US 2017/0201984 A1   Jul. 13, 2017

(30) Foreign Application Priority Data

May 29, 2014   (CN) .......................... 2014 1 0234093
Jun. 6, 2014   (CN) .......................... 2014 1 0250589
(Continued)

(51) Int. Cl.
*H04W 4/00*   (2018.01)
*H04W 72/04*   (2009.01)
(Continued)

(52) U.S. Cl.
CPC ....... *H04W 72/0446* (2013.01); *H04L 1/1864* (2013.01); *H04W 72/042* (2013.01); *H04W 72/10* (2013.01); *H04W 76/14* (2018.02)

(58) Field of Classification Search
CPC .. H04W 72/0446; H04W 76/14; H04W 72/10
(Continued)

(56) References Cited

U.S. PATENT DOCUMENTS

2012/0120889 A1   5/2012   Cheng et al.
2013/0121216 A1   5/2013   Chen et al.
(Continued)

FOREIGN PATENT DOCUMENTS

WO   2014007580 A1   1/2014

OTHER PUBLICATIONS

International Search Report dated Sep. 11, 2015 in connection with International Application No. PCT/KR2015/005445, 3 pages.
(Continued)

*Primary Examiner* — Christopher R Crompton

(57) ABSTRACT

Embodiments of the present invention provide a soft buffer processing method, comprising the steps of: first, receiving, by UE, D2D data and PDSCH data; and then performing soft buffer processing on the D2D data, and performing soft buffer processing on the PDSCH data. The present application further discloses a soft buffer processing apparatus. By the present application, the problem of soft buffer processing required for storing soft bits of D2D data and soft bits of PDSCH data can be solved, so that the link performance is improved.

20 Claims, 2 Drawing Sheets

(30) Foreign Application Priority Data

Aug. 4, 2014 (CN) .......................... 2014 1 0379734
Mar. 12, 2015 (CN) .......................... 2015 1 0109150

(51) Int. Cl.
*H04L 1/18* (2006.01)
*H04W 72/10* (2009.01)
*H04W 76/14* (2018.01)

(58) Field of Classification Search
USPC ........................................................ 370/329
See application file for complete search history.

(56) References Cited

U.S. PATENT DOCUMENTS

| | | | |
|---|---|---|---|
| 2013/0176981 A1 | 7/2013 | Earnshaw et al. | |
| 2013/0223353 A1 | 8/2013 | Liu et al. | |
| 2015/0180616 A1 | 6/2015 | Lee et al. | |
| 2017/0338917 A1* | 11/2017 | Oizumi | H04W 72/0446 |

OTHER PUBLICATIONS

Written Opinion of the International Searching Authority dated Sep. 11, 2015 in connection with International Application No. PCT/KR2015/005445, 7 pages.

* cited by examiner

[Fig. 1]
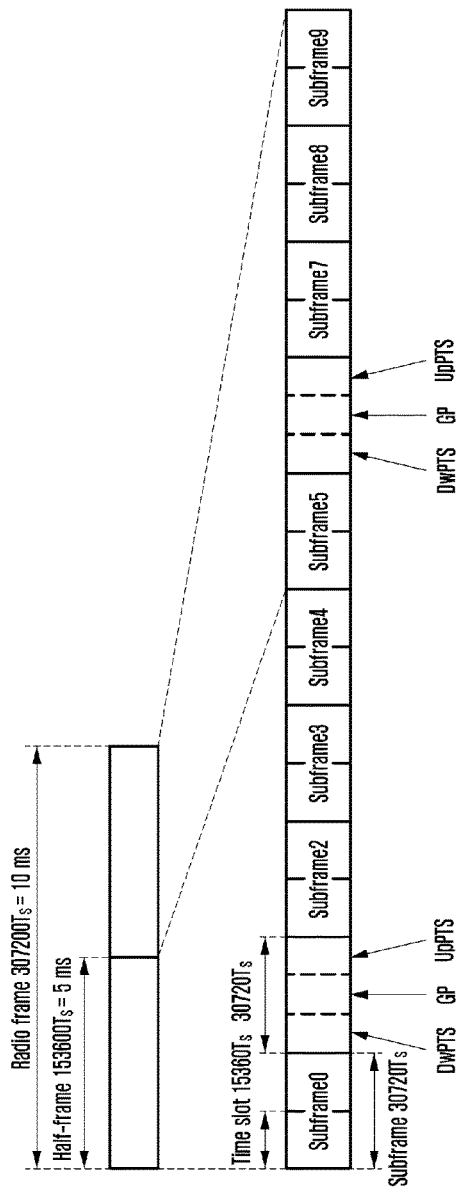
[Fig. 2]
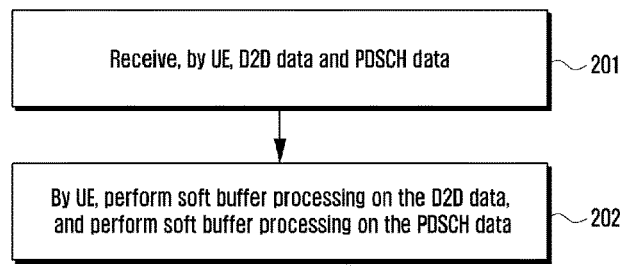

[Fig. 3]
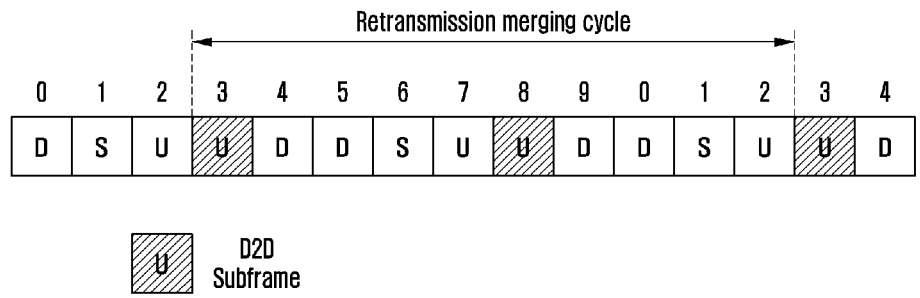
[Fig. 4]
[Fig. 5]
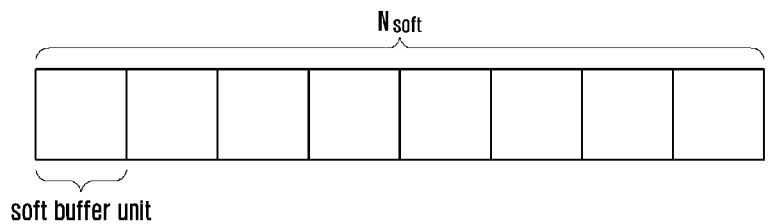
[Fig. 6]
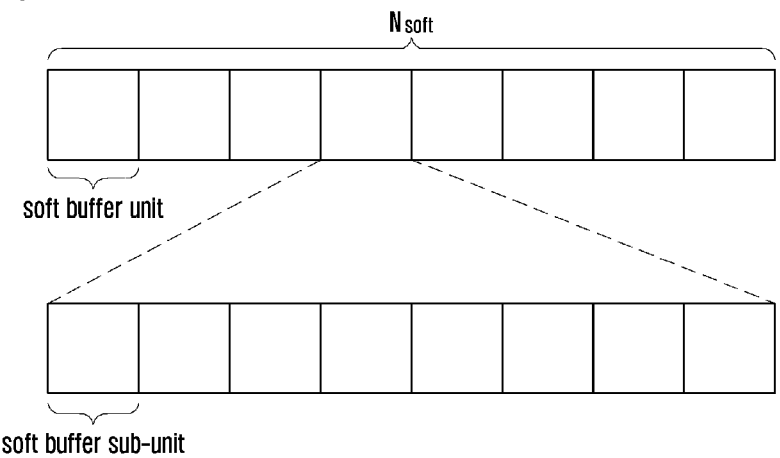

SOFT BUFFER PROCESSING METHOD AND APPARATUS

CROSS-REFERENCE TO RELATED APPLICATION(S)

The present application claims priority under 35 U.S.C. § 365 to International Patent Application No. PCT/KR2015/005445 filed May 29, 2015, entitled "SOFT BUFFER PROCESSING METHOD AND APPARATUS", and, through International Patent Application No. PCT/KR2015/005445, to Chinese Patent Application No. 201410234093.4 filed May 29, 2014, Chinese Patent Application No. 201410250589.0 filed Jun. 6, 2014, Chinese Patent Application No. 201410379734.5 filed Aug. 4, 2014, and Chinese Patent Application No. 201510109150.0 filed Mar. 12, 2015, each of which are incorporated herein by reference into the present disclosure as if fully set forth herein.

TECHNICAL FIELD

The present invention relates to the field of mobile communications, and particularly to a soft buffer processing method and apparatus.

BACKGROUND ART

A Long Term Evolution (LTE) system supports two working modes, i.e., Time Division Duplex (TDD) and Frequency Division Duplex (FDD). As shown in FIG. 1, a frame structure of a TDD system is shown. Each wireless frame is 10 ms in length and is bisected into two half-frames each 5 ms in length. Each half-frame contains 8 time slots each 0.5 ms in length and 3 special fields, i.e., a Downlink Pilot Time Slot (DwPTS), a Guard Period (GP) and an Uplink Pilot Time Slot (UpPTS). The sum of the length of the 3 special fields is 1 ms. Each subframe is formed of two continuous time slots, that is, the kth subframe contains a time slot 2k and a time slot 2k+1. The TDD system supports 7 uplink/downlink configurations, as shown in Table 1. Here, D is a downlink subframe, U is an uplink subframe, and S is a special subframe containing the above 3 special fields.

TABLE 1

| Config-uration No. | Cycle of conversion points | Sub frame No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D | for TDD, a physical Downlink Control Channel (PDCCH) schedules a Physical Downlink Shared Channel (PDSCH) within a current subframe. Furthermore, in one uplink subframe n, the HARQ-ACK information of PDSCHs in 0, 1 or more downlink subframes or HARQ-ACK information corresponding to PDCCHs indicating downlink Semi-Persistent Scheduling release (SPS release) may be fed back. The indexes of these downlink subframes are n-k, where k belongs to a set K, and the set K is determined by the TDD uplink/downlink configuration and an uplink subframe n, as shown in Table 2. For FDD, the HARQ-ACK information of PDSCHs of subframes n-k or of PDCCHs indicating SPS release is sent in the subframe n, where k=4.

TABLE 2

| Uplink/ downlink config-uration | Index set K | | | | | | | | | |
|---|---|---|---|---|---|---|---|---|---|---|
| | Sub frame index n | | | | | | | | | |
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

According to the above HARQ timing relation, in Release 8/9/10 of the LTE TDD, the maximum number of downlink HARQ processes corresponding to the above 7 TDD uplink/downlink configurations is different. Here, in order to ensure that a base station may clearly identify the respective parallel HARQ processes by HARQ process indexes in a PDCCH, the maximum number of downlink HARQ processes of each TDD uplink/downlink configuration is specified. A correspondence between the TDD uplink/downlink configuration and the maximum number of downlink HARQ processes is shown in Table 3. For FDD, the maximum number of downlink HARQ processes is 8.

TABLE 3

Correspondence between the TDD uplink/downlink configuration and the maximum number of downlink HARQ processes

| Uplink/downlink configuration | The maximum number of downlink HARQ processes |
|---|---|
| 0 | 4 |
| 1 | 7 |
| 2 | 10 |
| 3 | 9 |
| 4 | 12 |
| 5 | 15 |
| 6 | 6 |

The HARQ timing relation in Release 10 of the LET TDD has been described as above. Another problem related to HARQ is how to perform soft buffer processing.

In fact, there are many classes of UE according to the processing capability. The basis of classification is whether UE supports MIMO, the supported maximum number of data streams in MIMO, the size of a soft buffer and the like. Here, the soft buffer is used for storing the received soft bits when UE fails to correctly decode data sent by a base station. The soft bits in the soft buffer may be softly merged during HARQ re-transmission, so that the link performance is improved. The soft buffer processing will influence the rate matching (RM) of downlink data. In Release 10 of the LET TDD, the size of a soft buffer for the UE is described as $N_{soft}$, and the specific value of $N_{soft}$ is related to the capability of the UE. Whether the UE is in a single-carrier mode or in a CA mode, for each code block of one transport block, rate matching is $$N_{cb} = \min\left(\left\lfloor\frac{N_{IR}}{C}\right\rfloor, K_w\right),$$

where:

$$N_{IR} = \left\lfloor\frac{N_{soft}}{K_C \cdot K_{MIMO} \cdot \min(M_{DL\_HARQ}, M_{limit})}\right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{DL\_HARQ}$ is the maximum number of downlink HARQ processes determined according to Table 3;

$M_{limit}$ is a constant 8;

$K_w$ is the total number of code bits output by turbo coding; and the determination method of Kc is as follows: if $N_{soft}$=35982720, $K_c$=5; if $N_{soft}$ =3654144 and when UE cannot support more than two layers of spatial multiplexing when being in a downlink, $K_C$=2; and, in other cases, $K_C$=1.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support.

In Release 10 of LTE TDD, it is assumed that the UE equally divides its soft buffer to a plurality of cells. In order to better support HARQ Incremental Redundancy (IR), the base station needs to know which soft bits the UE stores when the UE fails to correctly decode one code block. Therefore, the number of the carriers configured by the UE is described as $N_{cells}^{DL}$, and for each cell and at least $K_{MIMO} \cdot \min(M_{DL\_HARQ}, M_{limit})$ transport blocks, when one code block of one transport block fails to be decoded, it is stipulated in the LTE-A that the UE needs to store soft bits $W_k, W_{k+1}, \ldots, W_{mod(k+n_{SB}-1,N_{cb})}$ at least for this code block, where:

$$n_{SB} = \min\left(N_{cb}, \left\lfloor\frac{N_{soft}}{C \cdot N_{cells}^{DL} \cdot K_{MIMO} \cdot \min(M_{DL\_HARQ}, M_{limit})}\right\rfloor\right);$$

is one soft bit received by the UE, and k is the smallest index among indexes of the soft bits received by the UE.

In a present LET system, if UE is in connection with a cellular network, the UE needs to receive PDSCH data sent by a base station and also D2D (Device-to-Device) signals or channels.

The D2D communication under the coverage of an LTE cell occupies uplink resources, i.e., an uplink carrier of an FDD cell or an uplink subframe of a TDD cell.

The UE needs to receive PDSCH data sent by a base station and also D2D data. When the UE fails to correctly decode the PDSCH data sent by the base station, the received soft bits are stored, and the soft bits may be softly merged during HARQ re-transmission, so that the link performance is improved. When the UE fails to correctly decode the D2D data sent by other UE, the received soft bits are stored, and the soft bits may be softly merged between multiple times of transmission of the D2D data, so that the D2D link performance is improved. At present, the soft buffer for the UE is used for storing soft bits of PDSCH data, but a soft buffer is also required to store soft bits of D2D data.

D2D includes D2D discovery and D2D communication, where D2D communication in turn includes Scheduling Assignment (SA) for scheduling D2D communication and D2D communication data. The D2D data as described in this application includes D2D discovery information, SA and D2D communication data, all of these data are transmitted for many times and many times of transmission are combined and then decoded. The number of bits of the D2D discovery information is constant, i.e., 232 bits, occupying two physical resource blocks for transmission; the number of bits of SA is related to the bandwidth of the carrier, and the number of bits of the SA is small, even smaller than that of the D2D discovery information.

DISCLOSURE OF INVENTION

Technical Problem

However, the number of bits of the D2D communication data is large, may occupy the whole system bandwidth for transmission, and is equivalent to the bits of information transmitted over normal cellular communications.

Therefore, it is necessary to provide effective technical solutions for solving the problem of soft buffer processing required for storing soft bits of D2D data and soft bits of PDSCH data.

Solution to Problem

An objective of the present invention is to solve at least one of the above technical defects, so that the soft buffer processing may be performed in a WAN system configured with D2D receiving subframes, and the problem of soft buffer processing required for receiving D2D data and PDSCH data is solved.

The present application provides a soft buffer processing method, including the steps of:

A. receiving, by User Equipment (UE), Device-to-Device (D2D) data and Physical Downlink Shared Channel (PDSCH) data; and B. by the UE, performing soft buffer processing on the D2D data, and performing soft buffer processing on the PDSCH data.

Preferably, the method may further include the step of: configuring a dedicated soft buffer for the D2D data; and the performing soft buffer processing on the D2D date includes the step of: storing soft bits of the D2D data in the dedicated soft buffer for the D2D data.

Preferably, the method may further include the step of: receiving signaling from a base station, acquiring information about the size of the soft buffer for the D2D and information about the size of a soft buffer for the UE; and the step B includes the step of: storing, according to the information about the size of the soft buffer for the D2D, soft bits of the D2D data in a part of a corresponding size of the soft buffer for the UE, and storing soft bits of the PDSCH data in the remaining part in the soft buffer for the UE.

Preferably, the storing soft bits of the D2D data includes:
for each D2D subframe, storing soft bits $W_k, W_{k+1}, \ldots, W_{mode(k+n_{SB}-1, N_{cb})}$ at least for each code block of one transport block, where:

$$n_{SB} = \left\lfloor \frac{N_{soft\_D2D}}{C \cdot \min(L, M_{limit})} \right\rfloor \text{ or } n_{SB} = \left\lfloor \frac{N_{soft\_D2D}}{C \cdot L} \right\rfloor;$$

$$N_{cb} = \min\left(\left\lfloor \frac{N_{IR}}{C} \right\rfloor, K_w\right);$$

$$N_{IR} = \left\lfloor \frac{N_{soft\_D2D}}{\min(L, M_{limit})} \right\rfloor \text{ or } N_{IR} = \left\lfloor \frac{N_{soft\_D2D}}{L} \right\rfloor;$$

Nsoft_D2D is information about the size of a soft buffer for the D2D shared by D2D processes of retransmission mode configured within one merging cycle;

C is the total number of code blocks divided from a transport block;

$M_{limit}$ is a constant 8;

$K_w$ is the total number of code bits output by turbo coding; and

L is the number of the D2D processes of retransmission mode configured within one merging cycle Preferably, the storing soft bits of the D2D data includes:
for each D2D subframe, storing soft bits $W_k, W_{k+1}, \ldots, W_{mode(k+n_{SB}-1, N_{cb})}$ at least for each code block of one transport block, where:

$$n_{SB} = \left\lfloor \frac{N_{soft\_D2D}}{C} \right\rfloor;$$

$$N_{cb} = \min\left(\left\lfloor \frac{N_{IR}}{C} \right\rfloor, K_w\right);$$

$$N_{IR} = N_{soft\_D2D};$$

Nsoft_D2D is information about the size of a soft buffer for the D2D used by a single D2D process of retransmission mode;

C is the total number of code blocks divided from a transport block;

$M_{limit}$ is a constant 8; and limit $K_w$ is the total number of code bits output by turbo coding.

Preferably, the storing soft bits of the PDSCH data in the remaining part of the soft buffer for the UE includes:
for each carrier configured for the UE, storing, when one code block of one transport $W_k, W_{k+1}, \ldots, W_{mode(k+n_{SB}-1, N_{cb})}$ at least for this code in the remaining part of the soft buffer for the UE, where:

$$n_{SB} = \min\left(N_{cb}, \left\lfloor \frac{N_{soft} - N_{soft\_D2D}}{C \cdot N_{cells}^{DL} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft} - N_{soft\_D2D}}{K_c \cdot K_{MIMO} \cdot \min(M_{DL\_HARQ}, M_{limit})} \right\rfloor \text{ or }$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

Nsoft_D2D is information about the size of the soft buffer for the D2D shared by D2D processes of retransmission mode configured within one merging cycle;

C is the total number of code blocks divided from a transport block;

$N_{cells}^{DL}$ is the number of carriers configured for the UE;

for an MIMO transmission mode, KMIMO=2, while for a non-MIMO transmission mode, KMIMO=1;

$M_{DL\_HARQ}$ is the maximum number of downlink HARQ processes determined according to the TDD uplink/downlink configuration of the UE;

$M_{limit}$ is a constant 8;

$K_w$ is the total number of code bits output by turbo coding; and $W_k$ is one soft bit received by the UE, and k is the smallest index among indexes of the soft bits received by the UE.

Preferably, the storing soft bits of the PDSCH data in the remaining part of the soft buffer for the UE includes:
for each carrier configured for the UE, storing, when one code block of one transport block fails to be decoded, soft bits $W_k, W_{k+1}, \ldots, W_{mode(k+n_{SB}-1, N_{cb})}$ at least for this code block in the remaining part of the soft buffer for the UE, where:

$$n_{SB} = \min\left(N_{cb}, \left\lfloor \frac{N_{soft} - L^* N_{soft\_D2D}}{C \cdot N_{cells}^{DL} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft} - L^* N_{soft\_D2D}}{K_c \cdot K_{MIMO} \cdot \min(M_{DL\_HARQ}, M_{limit})} \right\rfloor \text{ or }$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

Nsoft_D2D is information about the size of the soft buffer for the D2D used by a single D2D process of retransmission mode;

L is the number of the D2D processes of retransmission mode configured within one merging cycle;

C is the total number of code blocks divided from a transport block;

$N_{cells}^{DL}$ is the number of carriers configured for the UE;

for an MIMO transmission mode, KMIMO=2, while for a non-MIMO transmission mode, KMIMO=1;

$M_{DL\_HARQ}$ is the maximum number of downlink HARQ processes determined according to the TDD uplink/downlink configuration of the UE;

$M_{limit}$ is a constant 8;

$K_w$ is the total number of code bits output by turbo coding;

$W_k$ is one soft bit received by the UE, and k is the smallest index among indexes of the soft bits received by the UE; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

Preferably, the method may further include the step of:
receiving signaling from a base station, and acquiring information about the size of a soft buffer for the UE; and the step B includes the step of: storing soft bits of the D2D data and soft bits of the PDSCH data in the soft buffer for the UE.

Preferably, the storing soft bits of the PDSCH data includes:
for each carrier configured for the UE, storing, by the UE, when one code block of one transport block fails to be decoded, soft bits $W_k, W_{k+1}, \ldots, W_{mode(k+n_{SB}-1, N_{cb})}$ at least for this code, where:

$$n_{SB} = \min\left(N_{cb}, \left\lfloor \frac{N_{soft}}{C \cdot N_{cells}^{DL} \cdot K_{MIMO} \cdot \min(M'_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M'_{DL\_HARQ}, M_{limit})} \right\rfloor \text{ or}$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

C is the total number of code blocks divided from a transport block;

$N_{cells}^{DL}$ is the number of carriers configured for the UE;

for an MIMO transmission mode, KMIMO=2, while for a non-MIMO transmission mode, KMIMO=1;

$M_{DL\_HARQ}$ is the maximum number of downlink HARQ processes determined according to the TDD uplink/downlink configuration of the UE;

$M'_{DL\_HARQ}$ is a sum of $M_{DL\_HARQ}$ and L;

L is the number of the D2D processes of retransmission mode configured within one merging cycle;

$M_{limit}$ is a constant 8;

$K_w$ is the total number of code bits output by turbo coding;

$W_k$ is one soft bit received by the UE, and k is the smallest index among indexes of the soft bits received by the UE; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

Preferably, the step B includes:

for each carrier configured for the UE and a cell configured with a D2D subframe, storing, by the UE, when one code block of one transport block fails to be decoded, soft bits $W_k$ $W_{k+1}$, . . . , $W_{mode(k+n_{SB}-1,N_{cb})}$ at least for this code block, where:

$$n_{SB} = \min\left(N_{cb}, \left\lfloor \frac{N_{soft}}{C \cdot N'_{cells}^{DL} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

C is the total number of code blocks divided from a transport block;

$N'_{cells}^{DL} = N_{cells}^{DL} + N_{D2D}$, where $N_{cells}^{DL}$ is the number of carriers configured for the UE, and $N_{D2D}$ is the number of cells configured with D2D subframes;

for an MIMO transmission mode, KMIMO=2, while for a non-MIMO transmission mode, KMIMO=1;

$M_{DL\_HARQ}$ is the maximum number of downlink HARQ processes determined according to the TDD uplink/downlink configuration of the UE;

$M_{limit}$ is a constant 8;

$K_w$ is the total number of code bits output by turbo coding;

$W_k$ is one soft bit received by the UE, and k is the smallest index among indexes of the soft bits received by the UE; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

Preferably, the D2D data comprises D2D discovery information, Scheduling Assignment (SA) for scheduling D2D communication, D2D communication data of public safety and D2D communication data of non-public safety;

the method further comprises the steps of: when the number of soft bits of the PDSCH data and D2D data to be stored exceeds the size of the soft buffer for the UE, storing the soft bits of the PDSCH data and D2D data based on the priority of storage of soft bits, from the highest priority to the lowest:

PDSCH data, SA for scheduling D2D communication, D2D communication data of public safety, D2D communication data of non-public safety, D2D discovery information;

or, PDSCH data, D2D communication data of public safety, SA for scheduling D2D communication, D2D communication data of non-public safety, D2D discovery information;

or, SA for scheduling D2D communication, PDSCH data, D2D communication data of public safety, D2D communication data of non-public safety, D2D discovery information;

or, SA for scheduling D2D communication, D2D communication data of public safety, PDSCH data, D2D communication data of non-public safety, D2D discovery information;

or, D2D communication data of public safety, PDSCH data, SA for scheduling D2D communication, D2D communication data of non-public safety, D2D discovery information;

or, D2D communication data of public safety, SA for scheduling D2D communication, PDSCH data, D2D communication data of non-public safety, D2D discovery information.

Preferably, the method further includes the steps of: if there are any soft bits of data in the soft buffer with a priority lower than that of the data to be stored and the unoccupied soft buffer is smaller than the soft bits of the data to be stored, the soft bits stored in the soft buffer are released from the lowest priority to the highest until there is no soft bit of data in the soft buffer with a priority lower than that of the data to be stored or until the unoccupied soft buffer is larger than or equal to the soft bits of the data to be stored.

Preferably, the PDSCH data, the D2D communication data of public safety and the D2D communication data of non-public safety are stored in soft buffer units divided from the soft buffer, the size of each soft buffer unit being $$\left(\left\lfloor \frac{N_{soft}}{N_{cells}^{DL} \cdot K_{MIMO} \cdot \min(M_{DL\_HARQ}, M_{limit})} \right\rfloor\right),$$

where, Nsoft is information about the size of the soft buffer for the UE; $N_{cells}^{DL}$ is the number of carriers configured for the UE; for an MIMO transmission mode, KMIMO=2, while for a non-MIMO transmission mode, KMIMO=1; for a TDD serving cell, $M_{DL\_HARQ}$ is the maximum number of downlink HARQ processes determined according to the TDD uplink/downlink configuration of the UE, while for an FDD serving cell, $M_{DL\_HARQ}$ is equal to 8; $M_{limit}$ is a constant 8;

the D2D discovery information is stored in a soft buffer sub-unit of a first type divided from the soft buffer unit, the size of the soft buffer sub-unit of the first type being 256*t bits;

the SA for scheduling D2D communication is stored in the soft buffer sub-unit of the first type or in a soft buffer sub-unit of a second type divided from the soft buffer unit, the size of the soft buffer sub-unit of the second type being determined upon the bandwidth of a carrier transmitting the D2D data.

Preferably, the method may further include the step of: receiving signaling from a base station, and acquiring information about the size of a soft buffer for the UE; and the step B includes the step of: storing, according to the duplex mode of a cell where the UE is located and the type of D2D, soft bits of the D2D data and soft bits of the PDSCH data in the soft buffer for the UE.

Preferably, if the duplex mode of the cell where the UE is located is frequency division duplex and the type of the D2D is D2D communication, the storing soft bits of the PDSCH data includes:

for each carrier configured for the UE, storing, by the UE, when one code block of one transport block fails to be decoded, soft bits $W_k$ $W_{k+1}$, ..., $W_{mode(k+n_{SB}-1,N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor \right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

C is the total number of code blocks divided from a transport block;

$N'^{DL}_{cells} = N^{DL}_{cells} + N_{D2D}$, where $N^{DL}_{cells}$ is the number of carriers configured for the UE, and $N_{D2D}$ is the number of cells configured with D2D subframes;

for an MIMO transmission mode, KMIMO=2, while for a non-MIMO transmission mode, KMIMO=1;

$M_{DL\_HARQ}$ is equal to 8 or configured by high-level signaling;

$M_{limit}$ is a constant 8;

$K_w$ is the total number of code bits output by turbo coding;

$W_k$ is one soft bit received by the UE, and k is the smallest index among indexes of the soft bits received by the UE; and the determination method of Kc is as follows: if Nsoft=35982720, KC=5; if Nsoft=3654144 and when UE cannot support more than two layers of spatial multiplexing when being in a downlink, KC=2; and, in other cases, KC=1;

if the duplex mode of the cell is frequency division duplex and the type of the D2D is D2D communication, the storing soft bits of the D2D data includes:

for a cell configured with D2D subframes, storing, by the UE, when one code block of one transport block fails to be decoded, soft bits $W_k$ $W_{k+1}$, ..., $W_{mode(k+n_{SB}-1,N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor \right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

C is the total number of code blocks divided from a transport block;

$N^{DL}_{cells}$ is the number of carriers configured for the UE, for an MIMO transmission mode, KMIMO=2, while for a non-MIMO transmission mode, KMIMO=1;

$M_{DL\_HARQ}$ is equal to 8;

$M_{limit}$ is a constant 8;

$K_w$ is the total number of code bits output by turbo coding;

$W_k$ is one soft bit received by the UE, and k is the smallest index among indexes of the soft bits received by the UE; and the determination method of Kc is as follows: if Nsoft=35982720, KC=5; if Nsoft=3654144 and when UE cannot support more than two layers of spatial multiplexing when being in a downlink, KC=2; and, in other cases, KC=1;

Preferably, if the duplex mode of the cell where the UE is located is frequency division duplex and the type of the D2D is D2D discovery, the storing soft bits of the PDSCH data includes:

for each carrier configured for the UE, storing, by the UE, when one code block of one transport block fails to be decoded, soft bits $W_k$ $W_{k+1}$, ..., $W_{mode(k+n_{SB}-1,N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor \right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

C is the total number of code blocks divided from a transport block;

$N'^{DL}_{cells} = N^{DL}_{cells} + N_{D2D}$, where $N^{DL}_{cells}$ is the number of carriers configured for the UE, and $N_{D2D}$ is the number of cells configured with D2D subframes;

for an MIMO transmission mode, KMIMO=2, while for a non-MIMO transmission mode, KMIMO=1;

$M_{DL\_HARQ}$ is equal to 8 or configured by high-level signaling;

$M_{limit}$ is a constant 8;

$K_w$ is the total number of code bits output by turbo coding;

$W_k$ is one soft bit received by the UE, and k is the smallest index among indexes of the soft bits received by the UE; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

Preferably, when the number of soft bits of the PDSCH data to be stored and the number of soft bits of D2D discovery to be stored exceed the size of the soft buffer for the UE, preferably storing, by the UE, the soft bits of the D2D discovery until the soft bits of the D2D discovery to be stored is stored, and then the PDSCH data; or, preferably storing, by the UE, the PDSCH data until the PDSCH data at least to be stored is stored, and then the soft bits of the D2D discovery; or, determining, by the UE, a method for storing the soft bits of the PDSCH data and the soft bits of the D2D discovery.

Preferably, if the duplex mode of the cell where the UE is located is frequency division duplex and the type of the D2D is D2D discovery or D2D communication, the storing soft bits of the PDSCH data includes:

for each carrier configured for the UE, storing, by the UE, when one code block of one transport block fails to be decoded, soft bits $W_k$ $W_{k+1}$, . . . , $W_{mode(k+n_{SB}-1,N_{cb})}$ at least for this code block, where:

$$n_{SB} = \min\left(N_{cb}, \left\lfloor \frac{N_{soft}}{C \cdot N_{cells}^{'DL} \cdot K_{MIMO} \cdot \min(M_{DL\_HARQ}, M_{limit})} \right\rfloor \right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

Nsoft is information about the size of the soft buffer for the UE;

C is the total number of code blocks divided from a transport block;

$N_{cells}^{DL}$ is the number of carriers configured for the UE;

for an MIMO transmission mode, KMIMO=2, while for a non-MIMO transmission mode, KMIMO=1;

$M_{DL\_HARQ}$ is the maximum number of downlink HARQ processes determined according to the TDD uplink/downlink configuration of the UE; or, if the TDD uplink/downlink configuration of the cell where the UE is located is 2, 3, 4 and 5, $M_{DL\_HARQ}$ is the maximum number of downlink HARQ processes determined according to the TDD uplink/downlink configuration of the UE; and if the TDD uplink/downlink configuration of the cell where the UE is located is 0, 1 and 6, $M_{DL\_HARQ}$ is configured by high-level signaling or $M_{DL\_HARQ}$ is equal to 8;

$M_{limit}$ is a constant 8;

$K_w$ is the total number of code bits output by turbo coding;

$W_k$ is one soft bit received by the UE, and k is the smallest index among indexes of the soft bits received by the UE; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

Preferably, when the number of soft bits of the PDSCH data to be stored or the number of soft bits of D2D discovery or D2D communication to be stored exceed the size of the soft buffer for the UE, preferably storing, by the UE, the soft bits of the D2D discovery or D2D communication until the soft bits of the D2D discovery or D2D communication to be stored is stored, and then the PDSCH data; or, preferably storing, by the UE, the PDSCH data until the PDSCH data at least to be stored is stored, and then the soft bits of the D2D discovery or D2D communication; or, determining, by the UE, a method for storing the soft bits of the PDSCH data and the soft bits of the D2D discovery or D2D communication.

The present application further provides a soft buffer processing method, including the steps of:

A: receiving, by UE, D2D data; and

B: performing, by the UE, soft buffer processing on the D2D data.

Preferably, the step B includes:

storing soft bits of the D2D data in a dedicated soft buffer for the D2D data, or storing soft bits of the D2D data in a soft buffer for the UE, the soft buffer for the UE being used for storing PDSCH data.

The present application further provides a soft buffer processing apparatus, including:

a receiving module, configured to receive D2D data and PDSCH data; and a soft buffer processing module, configured to perform soft buffer processing on the D2D data and perform soft buffer processing on the PDSCH data.

Advantageous Effects of Invention

It can be seen from the above technical solutions that, in the technical solutions for soft buffer processing provided by the present application, by receiving, by UE, D2D data and PDSCH data, and then performing soft buffer processing on the D2D data in a corresponding manner and performing soft buffer processing on the PDSCH data in a corresponding manner, the problem of soft buffer processing of dada in the HARQ downlink transmission of PDSCH data and the problem of soft buffer processing of D2D data are reasonably handled, when receiving D2D data and PDSCH data. The soft buffer processing of the D2D data may be ensured, while having small influence to the PDSCH soft buffer processing and keeping the requirements on the functionality of the UE unchanged, so that the link performance is improved.

BRIEF DESCRIPTION OF DRAWINGS

The foregoing and/or additional aspects and advantages of the present invention will become apparent from and be more readily appreciated from the following descriptions of embodiments taken with reference to the drawings. In the drawings:

FIG. 1 is a schematic diagram of a TDD system frame structure;

FIG. 2 is a flowchart of a soft buffer processing method according to the present invention;

FIG. 3 is a schematic diagram of a D2D retransmission within a merging cycle according to an embodiment of the present invention;

FIG. 4 is a structural composition diagram of a preferred soft buffer processing apparatus according to the present invention;

FIG. 5 is an assignment diagram of a preferred soft buffer unit according to an embodiment of the application; and FIG. 6 is an assignment diagram of a preferred soft buffer sub-unit according to an embodiment of the application.

MODE FOR THE INVENTION

Embodiments of the present invention will be described in details hereafter. The examples of the embodiments will be illustrated by the accompanying drawings throughout which similar or same reference symbols represent similar or same elements or elements with same or similar functions. The embodiments described with reference to the drawings are intended to explain the present invention and shall not be construed as limitation to the present invention.

As an existing soft buffer of the UE is used for storing soft bits of PDSCH data, and a soft buffer is also needed to store soft bits of D2D data. It is required to solve a problem of soft buffer of soft bits of Hybrid Automatic Repeat reQuest (HARQ) downlink data and D2D data based on a Wide Area Network (WAN). To achieve the objective of the present invention, the present application provides a soft buffer processing method. As shown in FIG. 2, the method includes the following steps:

Step 201: D2D data and PDSCH data are received by UE.

The UE may acquire distribution information of D2D subframes, so as to know which subframes are used for D2D transmission and reception.

Step 202: Soft buffer processing is performed on both the D2D data and the PDSCH data by the UE.

When a part of subframes in uplink subframes of a TDD or FDD serving cell where the UE is located are configured as D2D subframes, the UE currently has D2D processes of retransmission mode in one or more of the D2D subframes, and the newly transmitted data and the retransmitted data may be merged (for example, redundant incremental merging or chase merging, etc.), the soft bits of both the PDSCH data and the D2D data need to be specially processed. The D2D processes of retransmission mode refer to transmission of the D2D processes in hybrid retransmission (including hybrid retransmission with ACK feedback and hybrid retransmission without ACK feedback) modes.

The PDSCH soft buffer processing method and the D2D soft buffer processing method will be specifically described as below by specific embodiments.

Embodiment 1

In this embodiment, the UE uses an additional soft buffer to store soft bit information of the D2D transmission. That is, the UE does not use a soft buffer currently used for receiving PDSCH data to store soft bits of the D2D data. If the UE has a D2D receiving function and is configured with a dedicated soft buffer for storing D2D data, the UE capability information of UE supporting D2D includes information about the size of a soft buffer for the D2D. For example, the information about the size may be a level of size, and different levels of size are corresponding to different sizes of soft buffers Nsoft_D2D. The Nsoft_D2D is indicated by the UE capability information, and different UE capabilities are corresponding to different values of Nsoft_D2D. For D2D broadcast communication, the UE, which transmits D2D data, may be unaware of the level of size of a D2D soft buffer of the UE which receives the D2D data. Therefore, in a protocol, it is required to determine a value of Nsoft_D2D for the UE supporting D2D. For example, according to the maximum value of broadcast communication data blocks possibly to be transmitted, the value of the size of a minimum D2D soft buffer of receiving UE may be determined via a protocol.

Here, there are two different processing methods:

One processing method is: D2D processes of one or more retransmission modes configured within a D2D data merging cycle share a D2D soft buffer of a size of Nsoft_D2D; and The other processing method is: Nsoft_D2D is the size of a soft buffer available for every D2D process of retransmission mode.

Corresponding to the first processing method, for each code block of one transport block in the D2D broadcast communication, rate matching is performed according to the size $$N_{cb} = \min\left(\left\lfloor \frac{N_{IR}}{C} \right\rfloor, K_w\right)$$

of a soft buffer, where:

$$N_{IR} = \left\lfloor \frac{N_{soft\_D2D}}{\min(L, M_{limit})} \right\rfloor$$

or $$N_{IR} = \left\lfloor \frac{N_{soft\_D2D}}{L} \right\rfloor;$$

C is the total number of code blocks divided from a transport block;

$M_{limit}$ is a constant 8;

$K_w$ is the total number of code bits output by turbo coding; for each D2D subframe, the UE at least needs to store soft bits $W_k, W_{k+1}, \ldots, W_{mode(k+n_{SB}-1, N_{cb})}$ for each code block of one transport block, where:

$$n_{SB} = \left\lfloor \frac{N_{soft\_D2D}}{C \cdot \min(L, M_{limit})} \right\rfloor$$

or $$n_{SB} = \left\lfloor \frac{N_{soft\_D2D}}{C \cdot L} \right\rfloor;$$

and

L is the number of the D2D processes of retransmission mode configured within one merging cycle. The number of D2D processes includes the number of processes receiving D2D broadcast communication sent by a plurality of UE. The number of D2D processes also includes the number of processes receiving D2D broadcast communication sent by the same UE and having a plurality of different services. For example, if it is assumed that a serving cell has a TDD uplink/downlink configuration 1, subframe 3 and subframe 8 in each radio frame are configured as D2D subframes, and the D2D subframes have D2D processes of retransmission mode, the D2D data within a merging cycle may be retransmitted and merged. When the merging cycle is 10 ms, there are two D2D processes of retransmission mode within the merging cycle from subframe 0 of radio frame n to subframe 0 of radio frame n+1, as shown in FIG. 3, i.e., L=2. Or, the maximum number of D2D processes of D2D broadcast communication retransmission mode is determined by a protocol.

Corresponding to the other processing method, for each code block of one transport block in the D2D broadcast communication, rate matching is performed according to the size $$N_{cb} = \min\left(\left\lfloor \frac{N_{IR}}{C} \right\rfloor, K_w\right)$$

of a soft buffer, where:

$N_{IR} = N_{soft\_D2D}$;

C is the total number of code blocks divided from a transport block;

$M_{limit}$ is a constant 8;

$K_w$ is the total number of code bits output by turbo coding; for each D2D subframe, the UE at least needs to store soft bits $W_k, W_{k+1}, \ldots, W_{mode(k+n_{SB}-1, N_{cb})}$ for each code block of one transport block, where:

$$n_{SB} = \left\lfloor \frac{N_{soft\_D2D}}{C} \right\rfloor.$$

For a soft buffer for the PDSCH, the UE utilizes the size of the soft buffer indicated by the existing capability, and the size of the soft buffer for the UE is recorded as Nsoft. Therefore, no matter the UE is in a single-carrier mode or in a CA mode, for each code block of one transport block, rate matching is performed according to the size $$N_{cb} = \min\left(\left\lfloor \frac{N_{IR}}{C} \right\rfloor, K_w\right)$$

of the soft buffer, where:

$$N_{IR} = \left\lfloor \frac{N_{soft}}{K_c \cdot K_{MIMO} \cdot \min(M_{DL\_HARQ}, M_{limit})} \right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{DL\_HARQ}$ is the maximum number of downlink HARQ processes determined according to Table 3;

$M_{limit}$ is a constant 8;

$K_w$ is the total number of code bits output by turbo coding; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support.

It is assumed that the UE equally divides its soft buffer to a plurality of cells. In order to better support HARQ Incremental Redundancy (IR), a base station needs to know which soft bits the UE stores when the UE fails to correctly decode one code block. Therefore, the number of the carriers configured by the UE is described as $N_{cells}^{DL}$, and for each cell and at least $K_{MIMO} \cdot \min(M_{DL\_HARQ}, M_{limit})$ transport blocks, when one code block of one transport block fails to be decoded, the UE needs to store soft bits $W_k, W_{k+1}, \ldots, W_{mode(k+n_{SB}-1,N_{cb})}$ at least for this code block, where:

$$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right);$$

is one soft bit received by the UE, and k is the smallest index among indexes of the soft bits received by the UE.

Embodiment 2

In this embodiment, D2D data and PDSCH data share an existing soft buffer. A D2D soft buffer processing method is as follows: UE receives the size Nsoft_D2D of a D2D soft buffer configured by high-level signaling from a base station, and one or more D2D processes of retransmission mode configured within a D2D data merging cycle share this D2D soft buffer of the size Nsoft_D2D. Another D2D soft buffer processing method is as follows: the UE receives the size Nsoft_D2D of a D2D soft buffer configured by high-level signaling from the base station. At this time, Nsoft_D2D is the size of a soft buffer available for every D2D process of retransmission mode. Based on the configured D2D soft buffer, in this embodiment, the soft buffer processing mode of D2D data is the same as Embodiment 1, and will not be repeated here.

When all D2D processes of retransmission mode configured within a D2D data merging cycle share the configured D2D soft buffer, the soft buffer processing method of PDSCH is as follows: the size of a soft buffer for the UE available for PDSCH transmission is $N_{soft}$-Nsoft_D2D. For example, in Release 10 of the LTE TDD, the size of the soft buffer for the UE is recoded as $N_{soft}$. So, no matter the UE is in a single-carrier mode or in a CA mode, for each code block of one transport block, rate matching is performed according to the size $$N_{cb} = \min\left(\left\lfloor \frac{N_{IR}}{C} \right\rfloor, K_w\right)$$

of the soft buffer. Here, the present application provides two preferred methods for determining $N_{IR}$.

One method for determining $N_{IR}$ is as follows: during determining $N_{IR}$, the size of a soft buffer for storing PDSCH data is regarded as the difference between the soft buffer for the UE and the soft buffer for storing D2D data, that is, $$N_{IR} = \left\lfloor \frac{N_{soft} - N_{soft\_D2D}}{K_c \cdot K_{MIMO} \cdot \min(M_{DL\_HARQ}, M_{limit})} \right\rfloor.$$

This method can ensure that the size of a soft buffer reserved by a sending terminal for each code block is more approximate to the actual needs, and the division of the soft buffer is superior.

Another method for determining $N_{IR}$ is as follows: during determining $N_{IR}$, the size of a soft buffer for storing PDSCH data is regarded as the size of a soft buffer for the UE. That is, no matter the UE actually receives D2D data or not, rate matching is performed according to the case where the UE does not configure D2D reception, $$N_{IR} = \left\lfloor \frac{N_{soft}}{K_C \cdot K_{MIMO} \cdot \min(M_{DL\_HARQ}, M_{limit})} \right\rfloor;.$$

The result of the above processing is the hypothetical HARQ soft buffer for one code block in rate matching may be greater than the soft buffer capacity that the UE can support. However, compared with the first method, this method has low implementation complexity.

The meanings of the physical quantities in the above formula are as mentioned above, and will not be repeated here.

As mentioned above, in this case, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support. In Release 10 of the LTE TDD, it is assumed that the UE equally divides its soft buffer to a plurality of cells. In order to better support HARQ Incremental Redundancy (IR), a base station needs to know which soft bits the UE stores when the UE fails to correctly decode one code block. Therefore, the number of the carriers configured by the UE is described as $N_{cells}^{DL}$, and for each cell and at least $K_{MIMO} \cdot \min(M_{DL\_HARQ}, M_{limit})$ transport blocks, when one code block of one transport block fails to be decoded, the UE needs to store soft bits $W_k$, $W_{k+1}, \ldots, W_{mode(k+n_{SB}-1,N_{cb})}$ at least for this code block, where:

$$n_{SB} = \min\left(N_{cb}, \left\lfloor \frac{N_{soft} - N_{soft\_D2D}}{C \cdot N_{cells}^{DL} \cdot K_{MIMO} \cdot \min(M_{DL\_HARQ}, M_{limit})} \right\rfloor \right);$$

$W_k$ is one soft bit received by the UE, and k is the smallest index among indexes of the soft bits received by the UE.

When Nsoft_D2D is the size of a soft buffer available for every D2D process of re-transmission mode, the soft buffer processing method of PDSCH is as follows: the UE subtracts the size of a D2D soft buffer from the size of a soft buffer indicated by the existing capability, where the size of the D2D soft buffer is equal to a product of multiplying the size of the soft buffer for each D2D process of retransmission mode by the number of D2D processes of retransmission mode configured within a D2D data merging cycle, i.e., L*Nsoft_D2D. Here, there are also two preferred methods for determining $N_{IR}$.

One method for determining $N_{IR}$ is as follows: during determining $N_{IR}$, the size of a soft buffer for storing PDSCH data is regarded as the difference between the soft buffer for the UE and the soft buffer for storing D2D data, that is, $$n_{SB} = \min\left(N_{cb}, \left\lfloor \frac{N_{soft} - L*N_{soft\_D2D}}{C \cdot N_{cells}^{DL} \cdot K_{MIMO} \cdot \min(M_{DL\_HARQ}, M_{limit})} \right\rfloor \right);$$

This method can ensure that the size of a soft buffer reserved by a sending terminal for each code block is more approximate to the actual needs, and the division of the soft buffer is superior.

Another method for determining $N_{IR}$ is as follows: during determining $N_{IR}$, the size of a soft buffer for storing PDSCH data is regarded as the size of a soft buffer for the UE. That is, no matter the UE actually receives D2D data or not, rate matching is performed according to the case where the UE does not configure D2D reception, that is, $$N_{IR} = \left\lfloor \frac{N_{soft}}{K_C \cdot K_{MIMO} \cdot \min(M_{DL\_HARQ}, M_{limit})} \right\rfloor;$$

The result of the above processing is the hypothetical HARQ soft buffer for one code block in rate matching may be greater than the soft buffer capacity that the UE can support. However, compared with the first method, this method has low implementation complexity.

The meanings of the physical quantities in the above formula are as mentioned above, and will not be repeated here.

As mentioned above, in this case, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support. In Release 10 of the LTE TDD, it is assumed that the UE equally divides its soft buffer to a plurality of cells. In order to better support HARQ Incremental Redundancy (IR), a base station needs to know which soft bits the UE stores when the UE fails to correctly decode one code block. Therefore, the number of the carriers configured by the UE is described as $N_{cells}^{DL}$, and for each cell and at least $K_{MIMO} \cdot \min(M_{DL\_HARQ}, M_{limit})$ transport blocks, when one code block of one transport block fails to be decoded, the UE needs to store soft bits $W_k$, $W_{k+1}, \ldots, W_{mode(k+n_{SB}-1,N_{cb})}$ at least for this code block, where:

$$n_{SB} = \min\left(N_{cb}, \left\lfloor \frac{N_{soft} - L*N_{soft\_D2D}}{C \cdot N_{cells}^{DL} \cdot K_{MIMO} \cdot \min(M_{DL\_HARQ}, M_{limit})} \right\rfloor \right);$$

$W_k$ is one soft bit received by the UE, and k is the smallest index among indexes of the soft bits received by the UE; and L is the number of D2D subframes configured within one D2D data merging cycle. For example, if it is assumed that a serving cell has a TDD uplink/downlink configuration 1, subframe 3 and subframe 8 in each radio frame are configured as D2D subframes, and the D2D subframes have D2D processes of retransmission mode, the D2D data within a merging cycle may be retransmitted and merged. When the merging cycle is 10 ms, there are two D2D processes of retransmission mode within the merging cycle from subframe 0 of radio frame n to subframe 0 of radio frame n+1, as shown in FIG. 3, i.e., L=2.

Embodiment 3

In this embodiment, D2D data and PDSCH data share an existing soft buffer. This embodiment differs from Embodiment in that: in this embodiment, the size of a soft buffer is divided uniformly for D2D processes of retransmission mode and downlink HARQ processes. That is, the two retransmission processes are not treated differently.

In this case, the soft buffer processing method of PDSCH is as follows: the size of a soft buffer for the UE is recorded as $N_{soft}$, no matter the UE is in a single-carrier mode or a CA mode, for each code block of one transport block, rate matching is performed according to the size $$N_{cb} = \min\left(\left\lfloor \frac{N_{IR}}{C} \right\rfloor, K_w\right)$$

of the soft buffer, where:

$$N_{IR} = \left\lfloor \frac{N_{soft}}{K_c \cdot K_{MIMO} \cdot \min(M'_{DL\_HARQ}, M_{limit})} \right\rfloor \text{ or}$$

$$N_{IR} = \left\lfloor \frac{N_{soft}}{K_c \cdot K_{MIMO} \cdot \min(M_{DL\_HARQ}, M_{limit})} \right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{limit}$ is a constant 8; $K_w$ is the total number of code bits output by turbo coding;

$M_{DL\_HARQ}$ is the maximum number of downlink HARQ processes determined according to Table 3;

$M'_{DL\_HARQ}$ is a sum of $M_{DL\_HARQ}$ and L; and

L is the number of the D2D processes of retransmission mode configured within one D2D data merging cycle.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support.

It is assumed that the UE equally divides its soft buffer to a plurality of cells. In order to better support HARQ Incremental Redundancy (IR), a base station needs to know which soft bits the UE stores when the UE fails to correctly decode one code block. Therefore, the number of the carriers configured by the UE is described as $N_{cells}^{DL}$, and for each cell and at least $K_{MIMO} \cdot \min(M_{DL\_HARQ}, M_{limit})$ transport blocks, when one code block of one transport block fails to be decoded, the UE needs to store soft bits $W_k, W_{k+1}, \ldots, W_{mode(k+n_{SB}-1,N_{cb})}$ at least for this code block, where:

$$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right);$$

$W_k$ is one soft bit received by the UE, and k is the smallest index among indexes of the soft bits received by the UE;

C is the total number of code blocks divided from a transport block;

KMIMO depends on the transmission mode of the UE; for an MIMO transmission mode, KMIMO=2, while for a non-MIMO transmission mode, KMIMO=1;

$M_{DL\_HARQ}$ is the maximum number of downlink HARQ processes determined according to Table 3;

$M'_{DL\_HARQ}$ is a sum of $M_{DL\_HARQ}$ and L; and

L is the number of D2D subframes configured within one D2D data merging cycle. For example, if it is assumed that a serving cell has a TDD uplink/downlink configuration 1, subframe 3 and subframe 8 in each radio frame are configured as D2D subframes, and the D2D subframes have D2D processes of retransmission mode, the D2D data within a merging cycle may be retransmitted and merged. When the merging cycle is 10 ms, there are two D2D subframes within the merging cycle from subframe 0 of radio frame n to subframe 0 of radio frame n+1, as shown in FIG. 3, i.e., L=2.

In this embodiment, by the above soft buffer processing method of PDSCH, soft buffer processing may be performed on the D2D data. And, $K_{mimo}=1$ may be established when soft buffer processing is performed on D2D data.

Embodiment 4

In this embodiment, D2D data and PDSCH data share an existing soft buffer, and the D2D transmission is processed as a separate cell.

The soft buffer processing method of PDSCH is as follows: in Release 10 of the LTE TDD, the size of a soft buffer for the UE is recorded as $N_{soft}$, no matter the UE is in a single-carrier mode or a CA mode, for each code block of one transport block, rate matching is performed according to the size $$N_{cb} = \min\left(\left\lfloor \frac{N_{IR}}{C} \right\rfloor, K_w\right)$$

of the soft buffer, where:

$$N_{IR} = \left\lfloor \frac{N_{soft}}{K_c \cdot K_{MIMO} \cdot \min(M_{DL\_HARQ}, M_{limit})} \right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{limit}$ is a constant 8;

$K_w$ is the total number of code bits output by turbo coding;

$M_{DL\_HARQ}$ is the maximum number of downlink HARQ processes determined according to Table 3; and the determination method of Kc is as follows: if $N_{soft}=35982720$, KC=5; if Nsoft=3654144 and when UE cannot support more than two layers of spatial multiplexing when being in a downlink, KC=2; and, in other cases, KC=1.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support. In Release 10 of the LTE TDD, it is assumed that the UE equally divides its soft buffer to a plurality of cells. In order to better support HARQ Incremental Redundancy (IR), the base station needs to know which soft bits the UE stores when the UE fails to correctly decode one code block. Therefore, the number of the carriers configured by the UE is described as $N_{cells}^{DL}$, and the number of cells configured with D2D subframes is recorded as $N_{D2D}$. When the number of cells is calculated, the cells configured with D2D subframes are regarded as separate cells. That is, the number of cells is calculated according to the following formula: $N'_{cells}^{DL} = N_{cells}^{DL} + N_{D2D}$. For example, when subframes of uplink carriers of one FDD cell are configured as D2D subframes, the downlink carriers of the FDD are regarded as one cell, and the uplink carriers of the FDD are regarded as one cell; and, when the subframes of uplink carriers of one FDD cell are not configured as D2D subframes, the downlink carriers of the FDD are regarded as one cell, while the uplink carriers of the FDD are not regarded as one cell. For another example, when subframes of uplink carriers of one TDD cell are configured as D2D subframes, the TDD is regarded as one cell or downlink subframes of the TDD are regarded as one cell, while subframes configured as D2D subframes in the TDD are regarded as another cell. Then, for each cell and at least $K_{MIMO} \cdot \min(M_{DL\_HARQ}, M_{limit})$ transport blocks, when one code block of one transport block fails to be decoded, the UE needs to store soft bits $W_k, W_{k+1}, \ldots, W_{mode(k+n_{SB}-1,N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor\right);$$

$W_k$ is one soft bit received by the UE, and k is the smallest index among indexes of the soft bits received by the UE;

$M_{DL\_HARQ}$ is the maximum number of downlink HARQ processes determined according to Table 3; and L is the number of D2D subframes configured within one D2D data merging cycle. For example, if it is assumed that a serving cell has a TDD uplink/downlink configuration 1, subframe 3 and subframe 8 in each radio frame are configured as D2D subframes, and the D2D data within a merging cycle may be HARQ merged. When the merging cycle is 10 ms, there are two D2D processes of retransmission mode within the merging cycle from subframe 0 of radio frame n to subframe 0 of radio frame n+1, as shown in FIG. 3, i.e., L=2.

By the soft buffer processing device and apparatus provided by the present invention, the problem of soft buffer processing of dada in the HARQ downlink transmission of PDSCH data and the problem of soft buffer processing of D2D data are reasonably handled, when receiving D2D data and PDSCH data, and the soft buffer processing of the D2D data may also be ensured, while having small influence to the PDSCH soft buffer processing and keeping the requirements on the functionality of the UE unchanged.

Embodiment 5

In this embodiment, the D2D discovery information, the SA for scheduling D2D communication, the D2D communication data and PDSCH data share an existing soft buffer.

The soft buffer processing method of PDSCH may be as follows: in LTE, the size of a soft buffer for the UE is recorded as $N_{soft}$, no matter the UE is in a single-carrier mode or a CA mode, for each code block of one transport block, rate matching is performed according to the size $$N_{cb} = \min\left(\left\lfloor \frac{N_{IR}}{C} \right\rfloor, K_w\right)$$

of the soft buffer, where:

$$N_{IR} = \left\lfloor \frac{N_{soft}}{K_c \cdot K_{MIMO} \cdot \min(M_{DL\_HARQ}, M_{limit})} \right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{limit}$ is a constant 8;

$K_w$ is the total number of code bits output by turbo coding; for a TDD serving cell, $M_{DL\_HARQ}$ is the maximum number of downlink HARQ processes determined according to Table 3, and for an FDD serving cell, $M_{DL\_HARQ}$ is equal to 8; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support. In LTE, it is assumed that the UE equally divides its soft buffer to a plurality of cells. In order to better support HARQ Incremental Redundancy (IR), the base station needs to know which soft bits the UE stores when the UE fails to correctly decode one code block. Therefore, the number of carriers configured for the UE is recorded as $N_{cells}^{DL}$ and for each cell and at least $K_{MIMO}$·min $(M_{DL\_HARQ}, M_{limit})$ transport blocks, when one code block of one transport block fails to be decoded, the UE needs to store soft bits $W_k, W_{k+1}, \ldots, W_{mode(k+n_{SB}-1,N_{cb})}$ at least for this code block, where:

$$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right);$$

$W_k$ is one soft bit received by the UE, and k is the smallest index among indexes of the soft bits received by the UE; and for a TDD serving cell, $M_{DL\_HARQ}$ is the maximum number of downlink HARQ processes determined according to Table 3, and for an FDD serving cell, $M_{DL\_HARQ}$ is equal to 8;

for the reception of the D2D discovery information, the SA for scheduling D2D communication and the D2D communication data, where the D2D communication data may include D2D communication data of public safety and D2D communication data of non-public safety, if the UE fails to correctly decode those D2D data, the UE needs to store soft bits of the D2D data in a soft buffer for the UE which is used for storing PDSCH data, then combine the D2D data transmitted for many times and decode them, thus to improve the success ratio of decoding. That is, the D2D discovery information, the SA for scheduling D2D communication, D2D communication data of public safety, D2D communication data of non-public safety and PDSCH data need to share the soft buffer for the PDSCH data. As the size of the soft buffer for the UE is limited, it is possible to have a situation where the soft bits of PDSCH data and those D2D data to be stored exceed the storage capability of the soft buffer for the UE. In this case, it is necessary to determine a priority of storage of soft bits and then sequentially store the soft bits generated by the reception of the above data according to the priority of storage of soft bits, which will be described as below.

First of all, a priority of storage of soft bits is determined for each of the D2D discovery information, the SA for scheduling D2D communication, D2D communication data of public safety, D2D communication data of non-public safety and PDSCH data, as shown below from the highest priority to the lowest:

a first order: PDSCH data, SA for scheduling D2D communication, D2D communication data of public safety, D2D communication data of non-public safety, D2D discovery information, where the priority of cellular communications is higher than that of D2D data of all types, and the SA for scheduling D2D communication is a control signaling with a priority higher than that of the D2D communication data of public safety;

a second order: PDSCH data, D2D communication data of public safety, SA for scheduling D2D communication, D2D communication data of non-public safety, D2D discovery information, where the priority of cellular communications is higher than that of D2D data of all types, and the SA for scheduling D2D communication may be D2D communication data of non-public safety or D2D communication content in which the UE is not interested with a priority lower than that of the D2D communication data of public safety;

a third order: SA for scheduling D2D communication, PDSCH data, D2D communication data of public safety, D2D communication data of non-public safety, D2D discovery information, where the SA for scheduling D2D communication is a control signaling with a priority higher than that of the PDSCH data and that of the D2D communication data of public safety, and the priority of cellular communications is higher than that of D2D communication data and that of the D2D discovery;

a fourth order: SA for scheduling D2D communication, D2D communication data of public safety, PDSCH data, D2D communication data of non-public safety, D2D discovery information, where the SA for scheduling D2D communication is a control signaling with a priority higher than that of the PDSCH data and that of the D2D communication data of public safety, and the D2D communication data of public safety is very important with a priority higher than that of the PDSCH data;

a fifth order: D2D communication data of public safety, PDSCH data, SA for scheduling D2D communication, D2D communication data of non-public safety, D2D discovery information, where the D2D communication data of public safety is very important with a priority higher than that of the PDSCH data and that of other D2D data;

a sixth order: D2D communication data of public safety, SA for scheduling D2D communication, PDSCH data, D2D communication data of non-public safety, D2D discovery information, where the D2D communication data of public safety is very important with a priority higher than that of the PDSCH data and that of other D2D data, and the SA for scheduling D2D communication is a control signaling with a priority higher than that of the PDSCH data, that of the D2D communication data of non-public safety and that of the D2D discovery.

It is to be specifically noted that, when one or more of those five data types do not exist at the present moment (i.e., not exist in the soft buffer and not received at the present moment), the UE does not need to compare the priority of the data that does not exist. That is, in this case, the UE just needs to compare the priorities of the data types received at the present moment and already existed in the soft buffer.

When the number of soft bits of the high-priority data to be stored and the number of soft bits of the low-priority data to be stored exceed the storage capability of the soft buffer for the UE, the present application provides the following processing methods: the UE preferably stores the soft bits of the high-priority data until the soft bits of the high-priority data to be stored are stored, and then the soft bits of the low-priority data. If the unoccupied soft buffer for the UE is not enough to store the soft bits of the first X high-priority data and there are soft bits of next Y low-priority data in the soft buffer for the UE, the UE releases the soft buffer occupied by the soft bits of the next Y low-priority data from the lowest priority to the highest and stores the soft bits of the first X high-priority data from the highest priority to the lowest, until the soft bits of the first X high-priority data to be stored are stored completely or the soft buffer occupied by the soft bits of the next Y low-priority data is released completely, where the values of X and Y may be flexibly decided by the type of the products, for example, at X=1 (prioritizing begins from 1), Y is the index corresponding to the data with the lowest priority. That is, if there are soft bits of data in the soft buffer with a priority lower than that of the data to be stored and the unoccupied soft buffer is smaller than the soft bits of the data to be stored, the soft bits stored in the soft buffer are released from the lowest priority to the highest until there is no soft bit of data in the soft buffer with a priority lower than that of the data to be stored or until the unoccupied soft buffer is larger than or equal to the soft bits of the data to be stored.

Preferably, for different transport blocks for data with a same priority, the UE preferably saves the soft bits corresponding to a transport block with a largest success ratio of decoding.

In addition, in each TTI, the UE may receive D2D discovery information sent by a plurality of other UE, now D2D discovery information sent by at most fifty other UE, and the D2D discovery information of each D2D discovery has 232 bits in total, hence, the soft buffer is first divided into units of equal size according to the requirement of the PDSCH data, with the size of each unit being $$\left(\left\lfloor \frac{N_{soft}}{N_{cells}^{DL} \cdot K_{MIMO} \cdot \min(M_{DL\_HARQ}, M_{limit})} \right\rfloor\right).$$

For example, it is assumed that the UE just configures one serving cell which is in the SIMO transmission mode and which is an FDD serving cell, $M_{DL\_HARQ}=8$, the assignment of the soft buffer is as shown in FIG. 5. For D2D communication data, the number of bits of the D2D communication data may be equivalent to that of the PDSCH data; hence, one D2D transport block may occupy one soft buffer unit. For the D2D discovery information, one obtained soft buffer unit may be further divided into soft buffer sub-units of equal size. One soft buffer unit is divided into n soft buffer sub-units of equal size, and each soft buffer sub-unit is used for storing the soft bits of the D2D discovery information. For example, each soft buffer sub-unit has 256*t bits (e.g., t=3). Each piece of D2D discovery information has 232 bits, plus 24 bits of CRC, 256 bits in total, and is then ⅓ decoded to obtain the number of bits of 256*3. The number of soft buffer sub-units of equal size divided from each soft buffer unit is as follows:

$$n = \left(\left\lfloor \left(\left\lfloor \frac{N_{soft}}{N_{cells}^{DL} \cdot K_{MIMO} \cdot \min(M_{DL\_HARQ}, M_{limit})} \right\rfloor\right) / (256*3) \right\rfloor\right),$$

with each D2D discovery data block occupying one soft buffer sub-unit. The assignment of the soft buffer sub-units is as shown in FIG. 6. For SA, as SA has less bits, one method is that one SA data block occupies one soft buffer sub-unit of a size the same as that $$\left(\left\lfloor \frac{N_{soft}}{N_{cells}^{DL} \cdot K_{MIMO} \cdot \min(M_{DL\_HARQ}, M_{limit})} \right\rfloor\right)$$

is divided into M soft buffer sub-units of a size of $N_{SA}$ bits, with each SA data block occupying one soft buffer sub-unit, where $N_{SA}$ is determined upon the bandwidth of the carrier for the D2D data.

Embodiment 6

In this embodiment, the UE does not receive PDSCH data. According to different implementation methods, the UE may use an additional soft buffer to store soft bit information of the D2D transmission, or use a soft buffer currently used for storing PDSCH data to store soft bits of D2D data. If the UE has a D2D receiving function and is configured with a dedicated soft buffer for storing D2D data, the capability information of UE supporting D2D includes information about the size of a soft buffer for the D2D. For example, the information about the size may be a level of size, and different levels of size are corresponding to different sizes of soft buffers Nsoft_D2D. The Nsoft_D2D is indicated by the UE capability information, and different UE capabilities are corresponding to different values of Nsoft_D2D. For D2D broadcast communication, the UE, which transmits D2D data, may be unaware of the level of size of a D2D soft buffer of the UE which receives the D2D data. Therefore, in a protocol, it is required to determine a value of Nsoft_D2D for the UE supporting D2D. For example, according to the maximum value of broadcast communication data blocks possibly to be transmitted, the value of the size of a minimum D2D soft buffer of receiving UE may be determined via a protocol.

Here, there are three different processing methods:

the first processing method: D2D processes of one or more retransmission modes configured within a D2D data merging cycles share a D2D soft buffer of a size Nsoft_D2D;

the second processing method: Nsoft_D2D is the size of a soft buffer available for every D2D process of retransmission mode; and the third processing method: the UE uses a soft buffer for cellular communication to store D2D data.

Corresponding to the first processing method, for each code block of one transport block in the D2D broadcast communication, rate matching is performed according to the size $$N_{cb} = \min\left(\left\lfloor \frac{N_{IR}}{C} \right\rfloor, K_w\right)$$

of the soft buffer, where:

$$N_{IR} = \left\lfloor \frac{N_{soft\_D2D}}{\min(L, M_{limit})} \right\rfloor \text{ or } N_{IR} = \left\lfloor \frac{N_{soft\_D2D}}{L} \right\rfloor;$$

C is the total number of code blocks divided from a transport block;

$M_{limit}$ is a constant 8; and $K_w$ is the total number of code bits output by turbo coding;

for each D2D subframe, the UE at least needs to store soft bits $W_k, W_{k+1}, \ldots, W_{mode(k+n_{SB}-1, N_{cb})}$ for each code block of one transport block, where:

$$n_{SB} = \left\lfloor \frac{N_{soft}}{C \cdot \min(L, M_{limit})} \right\rfloor \text{ or } n_{SB} = \left\lfloor \frac{N_{soft}}{C \cdot L} \right\rfloor;$$

and

L is the number of the D2D processes of retransmission mode configured within one merging cycle. The number of D2D processes includes the number of processes receiving D2D broadcast communication sent by a plurality of UE. The number of D2D processes also includes the number of processes receiving D2D broadcast communication sent by the same UE and having a plurality of different services. For example, if it is assumed that a serving cell has a TDD uplink/downlink configuration 1, subframe 3 and subframe 8 in each radio frame are configured as D2D subframes, and the D2D subframes have D2D processes of retransmission mode, the D2D data within a merging cycle may be retransmitted and merged. When the merging cycle is 10 ms, there are two D2D processes of retransmission mode within the merging cycle from subframe 0 of radio frame n to subframe 0 of radio frame n+1, as shown in FIG. 3, i.e., L=2. Or, the maximum number of D2D processes of D2D broadcast communication retransmission mode is determined by a protocol.

Corresponding to the other processing method, for each code block of one transport block in the D2D broadcast communication, rate matching is performed according to the size $$N_{cb} = \min\left(\left\lfloor \frac{N_{IR}}{C} \right\rfloor, K_w\right)$$

of a soft butter, where:

$N_{IR} = N_{soft\_D2D}$;

C is the total number of code blocks divided from a transport block;

$M_{limit}$ is a constant 8; and $K_w$ is the total number of code bits output by turbo coding;

for each D2D subframe, the UE at least needs to store soft bits $W_k, W_{k+1}, \ldots, W_{mode(k+n_{SB}-1, N_{cb})}$ for each code block of one transport block, where:

$$n_{SB} = \left\lfloor \frac{N_{soft\_D2D}}{C} \right\rfloor.$$

Corresponding to the third processing method, for each code block of one transport block in the D2D broadcast communication, rate matching is performed according to the size $$N_{cb} = \min\left(\left\lfloor \frac{N_{IR}}{C} \right\rfloor, K_w\right);$$

of a sof buffer, where:

$$N_{IR} = \left\lfloor \frac{N_{soft}}{\min(L, M_{limit})} \right\rfloor \text{ or } N_{IR} = \left\lfloor \frac{N_{soft}}{L} \right\rfloor;$$

C is the total number of code blocks divided from a transport block;

$M_{limit}$ is a constant 8;

$K_w$ is the total number of code bits output by turbo coding;

for each D2D subframe, the UE at least needs to store soft bits $W_k, W_{k+1}, \ldots, W_{mode(k+n_{SB}-1, N_{cb})}$ for each code block of one transport block, where:

$$n_{SB} = \left\lfloor \frac{N_{soft}}{C \cdot \min(L, M_{limit})} \right\rfloor \text{ or } n_{SB} = \left\lfloor \frac{N_{soft}}{C \cdot L} \right\rfloor;$$

and

L is the number of the D2D processes of retransmission mode configured within one merging cycle. The number of D2D processes includes the number of processes receiving D2D broadcast communication sent by a plurality of UE. The number of D2D processes also includes the number of processes receiving D2D broadcast communication sent by the same UE and having a plurality of different services. For example, if it is assumed that a serving cell has a TDD uplink/downlink configuration 1, subframe 3 and subframe 8 in each radio frame are configured as D2D subframes, and the D2D subframes have D2D processes of retransmission mode, the D2D data within a merging cycle may be retransmitted and merged. When the merging cycle is 10 ms, there are two D2D processes of retransmission mode within the merging cycle from subframe 0 of radio frame n to subframe 0 of radio frame n+1, as shown in FIG. 3, i.e., L=2. Or, the maximum number of D2D processes of D2D broadcast communication retransmission mode is determined by a protocol.

Embodiment 7

In this embodiment, D2D and PDSCH share an existing soft buffer, and different soft buffer processing is performed according to the duplex mode of a cell and the type of D2D.

There are the following methods for determining the type of the received D2D by UE.

Method 1: The UE determines whether the D2D is D2D discovery or D2D communication by receiving high-level signaling.

Method 2: The UE determines the D2D is D2D discovery or D2D communication by receiving a resource position of the D2D, because the D2D discovery and the D2D communication use different resources, respectively.

How to perform different soft buffer processing according to the duplex mode of a cell and the type of D2D will be described as below.

1) For an FDD cell, if D2D communication reception is configured, the soft buffer processing method is:

1.1) the soft buffer processing method of PDSCH is as follows: the size of a soft buffer for the UE is recorded as $N_{soft}$, no matter the UE is in a single-carrier mode or in a CA mode, for each code block of one transport block, rate matching is performed according to the size $$N_{cb} = \min\left(\left\lfloor \frac{N_{IR}}{C} \right\rfloor, K_w\right);$$

of the soft buffer, where:

$$N_{IR} = \left\lfloor \frac{N_{soft}}{K_C \cdot K_{MIMO} \cdot \min(M_{DL\_HARQ}, M_{limit})} \right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{limit}$ is a constant 8;

$K_w$ is the total number of code bits output by turbo coding;

$M_{DL\_HARQ}$ is equal to 8; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support. It is assumed that the UE divides its soft buffer to a plurality of cells. In order to better support HARQ Incremental Redundancy (IR), the base station needs to know which soft bits the UE stores when the UE fails to correctly decode one code block. Therefore, the number of the carriers configured by the UE is described as $N_{cells}^{DL}$, and the number of cells configured with D2D subframes is recorded as $N_{D2D}$. When the number of cells is calculated, the cells configured with D2D subframes are regarded as separate cells. That is, the number of cells is calculated according to the following formula: $N'_{cells}^{DL}=N_{cells}^{DL}+N_{D2D}$. For example, when UE configures only one FDD cell and when subframes of uplink carriers of the FDD cell are configured as D2D subframes, the downlink carriers of the FDD are regarded as one cell, and the uplink carriers of the FDD are regarded as one cell, i.e., $N'_{cells}^{DL}=N_{cells}^{DL}+N_{D2D}=1+1=2$; and, when the subframes of uplink carriers of one FDD cell are not configured as D2D subframes, the downlink carriers of the FDD are regarded as one cell, while the uplink carriers of the FDD are not regarded as one cell, i.e., $N'_{cells}^{DL}=N_{cells}^{DL}+N_{D2D}=1+0=1$. Then, for each cell and at least $K_{MIMO} \cdot \min(M_{DL\_HARQ}, M_{limit})$ transport blocks, when one code block of one transport block fails to be decoded, the UE needs to store soft bits $W_k, W_{k+1}, \ldots, W_{mode(k+n_{SB}-1,N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor\right);$$

$W_k$ is one soft bit received by the UE, and k is the smallest index among indexes of the soft bits received by the UE; and $M_{DL\_HARQ}$ is equal to 8.

1.2) The soft buffer processing method of D2D communication is as follows: the size of a soft buffer for the UE is recorded as $N_{soft}$, for each code block of one transport block, rate matching is performed according to the size $$N_{cb} = \min\left(\left\lfloor \frac{N_{IR}}{C} \right\rfloor, K_w\right)$$

of the soft buffer, where:

$$N_{IR} = \left\lfloor \frac{N_{soft}}{K_C \cdot K_{MIMO} \cdot \min(M_{DL\_HARQ}, M_{limit})} \right\rfloor;$$

C is the total number of code blocks divided from a transport block;

for the D2D, KMIMO=1;

$M_{limit}$ is a constant 8;

$K_w$ is the total number of code bits output by turbo coding; and the determination method of $M_{DL\_HARQ}$ may include the following two methods:

method 1: $M_{Dl\_HARQ}$ is equal to the maximum number of downlink HARQ processes of a PDSCH of an FDD cell, that is, $M_{DL\_HARQ}$ is equal to 8; and method 2: the $M_{Dl\_HARQ}$ corresponding to the D2D is configured by high-level signaling.

For D2D, for at least $K_{MIMO} \cdot \min(M_{DL\_HARQ}, M_{limit})$ transport blocks, when one code block of one transport block fails to be decoded, the UE needs to store soft bits $W_k, W_{k+1}, \ldots, W_{mode(k+n_{SB}-1,N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor\right);$$

$W_k$ is one soft bit received by the UE, and k is the smallest index among indexes of the soft bits received by the UE; and the determination method of $M_{DL\_HARQ}$ may include the following two methods:

method 1: $M_{DL\_HARQ}$ is equal to the maximum number of downlink HARQ processes of a PDSCH of an FDD cell, that is, $M_{DL\_HARQ}$ is equal to 8; and method 2: the $M_{DL\_HARQ}$ corresponding to the D2D is configured by high-level signaling.

2) For an FDD cell, where there is D2D discovery, the soft buffer processing method is:

2.1) the soft buffer processing method of PDSCH is as follows: the size of a soft buffer for the UE is recorded as $N_{soft}$, no matter the UE is in a single-carrier mode or in a CA mode, for each code block of one transport block, rate matching is performed according to the size $$N_{cb} = \min\left(\left\lfloor\frac{N_{IR}}{C}\right\rfloor, K_w\right)$$

of the soft buffer, where:

$$N_{IR} = \left\lfloor\frac{N_{soft}}{K_C \cdot K_{MIMO} \cdot \min(M_{DL\_HARQ}, M_{limit})}\right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{limit}$ is a constant 8;

$K_w$ is the total number of code bits output by turbo coding;

$M_{DL\_HARQ}$ is equal to the maximum number of downlink HARQ processes of a PDSCH of an FDD cell, that is, $M_{DL\_HARQ}$ is equal to 8; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support. It is assumed that the UE equally divides its soft buffer to a plurality of cells. In order to better support HARQ Incremental Redundancy (IR), a base station needs to know which soft bits the UE stores when the UE fails to correctly decode one code block. Therefore, the number of the carriers configured by the UE is described as $N_{cells}^{DL}$. Then, for at least $K_{MIMO} \cdot \min(M_{DL\_HARQ}, M_{limit})$ transport blocks, when one code block of one transport block fails to be decoded, the UE needs to store soft bits $W_k$, $W_{k+1}$, ..., $W_{mode(k+n_{SB}-1,N_{cb})}$ at least for this code block, where:

$$n_{SB} = \min\left(N_{cb}, \left\lfloor\frac{N_{soft}}{C \cdot N_{cells}^{DL} \cdot K_{MIMO} \cdot \min(M_{DL\_HARQ}, M_{limit})}\right\rfloor\right);$$

$W_k$ is one soft bit received by the UE, and k is the smallest index among indexes of the soft bits received by the UE; and $M_{Dl\_HARQ}$ is equal to 8.

2.2) When the number of soft bits of the PDSCH data to be stored and the number of soft bits of D2D discovery to be stored exceed the storage capability of the soft buffer for the UE, the present application provides three different processing methods:

the first processing method includes: preferably storing, by the UE, the soft bits of the D2D discovery until the soft bits of the D2D discovery to be stored is stored, and then the PDSCH data;

the second processing method includes: preferably storing, by the UE, the PDSCH data until the PDSCH data at least to be stored is stored (calculation is performed in the above-mentioned way), and then the soft bits of the D2D discovery; and the third processing method includes: determining, by the UE, a method for storing the soft bits of the PDSCH data and the soft bits of the D2D discovery, without any specification in the protocol.

3) For a TDD cell, the same soft buffer processing method is employed to the D2D communication and the D2D discovery, specifically:

3.1) the soft buffer processing method of PDSCH is as follows: the size of a soft buffer for the UE is recorded as $N_{soft}$, no matter the UE is in a single-carrier mode or in a CA mode, for each code block of one transport block, rate matching is performed according to the size $$N_{cb} = \min\left(\left\lfloor\frac{N_{IR}}{C}\right\rfloor, K_w\right);$$

of the soft buffer, where:

$$N_{IR} = \left\lfloor\frac{N_{soft}}{K_C \cdot K_{MIMO} \cdot \min(M_{DL\_HARQ}, M_{limit})}\right\rfloor;$$

C is the total number of code blocks divided from a transport block;

KMIMO depends on the transmission mode of the UE; for an MIMO transmission mode, KMIMO=2, while for a non-MIMO transmission mode, KMIMO=1;

$M_{limit}$ is a constant 8;

$K_w$ is the total number of code bits output by turbo coding;

the determination method of $M_{DL\_HARQ}$ may include the following two methods:

method 1: $M_{DL\_HARQ}$ is the maximum number of downlink HARQ processes determined according to Table 3; and method 2: if the TDD uplink/downlink configuration is 2, 3, 4 and 5, $M_{DL\_HARQ}$ is the maximum number of downlink HARQ processes determined according to Table 3; and if the TDD uplink/downlink configuration is 0, 1 and 6, $M_{DL\_HARQ}$ is configured by high-level signaling, or $M_{DL\_HARQ}$ is equal to 8; and the determination method of Kc is as follows: if Nsoft=35982720, KC=5; if Nsoft=3654144 and when UE cannot support more than two layers of spatial multiplexing when being in a downlink, KC=2; and, in other cases, KC=1.

In other words, no matter which carriers the UE works in, rate matching is performed according to the condition that the UE only configures the current one carrier. Thus, when the UE configures a plurality of cells, the processing result is that the hypothetical HARQ soft buffer for one code block in rate matching may be greater than the soft buffer capacity that the UE can support. It is assumed that the UE equally divides its soft buffer to a plurality of cells.

In order to better support HARQ Incremental Redundancy (IR), a base station needs to know which soft bits the UE stores when the UE fails to correctly decode one code block. Therefore, the number of the carriers configured by the UE is described as $N_{cells}^{Dl}$. Then, for each cell and at least $K_{MIMO} \cdot \min(M_{DL\_HARQ}, M_{limit})$ transport blocks, when one code block of one transport block fails to be decoded, the UE needs to store soft bits $W_k, W_{k+1}, \ldots, W_{mode(k+n_{SB}-1, N_{cb})}$ at least for this code block, where:

$$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right)$$

$W_k$ is one soft bit received by the UE, and k is the smallest index among indexes of the soft bits received by the UE; and the determination method of $M_{Dl\_HARQ}$ may include the following two methods:

method 1: $M_{DL\_HARQ}$ is the maximum number of downlink HARQ processes determined according to Table 3; and method 2: if the TDD uplink/downlink configuration is 2, 3, 4 and 5, $M_{DL\_HARQ}$ is the maximum number of downlink HARQ processes determined according to Table 3; and if the TDD uplink/downlink configuration is 0, 1 and 6, $M_{DL\_HARQ}$ is configured by high-level signaling, or $M_{Dl\_HARQ}$ is equal to 8.

3.2) When the number of soft bits of the PDSCH data to be stored and the number of soft bits of D2D discovery or D2D communication to be stored exceed the storage capability of the soft buffer for the UE, the present application provides three different processing methods:

the first processing method includes: preferably storing, by the UE, the soft bits of the D2D discovery or D2D communication until the soft bits of the D2D discovery or D2D communication to be stored is stored, and then the PDSCH data;

the second processing method includes: preferably storing, by the UE, the PDSCH data until the PDSCH data at least to be stored is stored (calculation is performed in the above-mentioned way), and then the soft bits of the D2D discovery or D2D communication; and the thirds processing method includes: determining, by the UE, a method for storing the soft bits of the PDSCH data and the soft bits of the D2D discovery or D2D communication, without any specification in a protocol.

Corresponding to the above methods, the present application further provides a soft buffer processing apparatus. As shown in FIG. 4, the apparatus includes:

a receiving module, configured to receive D2D data and PDSCH data; and a soft buffer processing module, configured to perform soft buffer processing on the D2D data and perform soft buffer processing on the PDSCH data.

By the soft buffer processing method and apparatus provided by the present invention, the problem of soft buffer processing of dada in the HARQ downlink transmission of PDSCH data and the problem on soft buffer processing of D2D data can be reasonably handled, when receiving D2D data and PDSCH data. The soft buffer processing of the D2D data may be ensured, while having small influence to the PDSCH soft buffer processing and keeping the requirements on the functionality of the UE unchanged.

The above descriptions are merely some of implementation manners of the present invention. It should be noted that, for a person skilled in the art, various improvements and modifications made be made without departing from the principle of the present invention, and these improvements and modifications shall be regarded of falling into the protection scope of the present invention.

The invention claimed is:

1. A soft buffer processing method by a terminal, comprising:
   receiving a first data of a device-to-device (D2D) communication;
   receiving a second data of a downlink transmission on a physical downlink shared channel (PDSCH);
   identifying whether a soft bit to be stored of the first data and the second data exceeds a size of a soft buffer;
   determining a priority for the first data and the second data, if the soft bit to be stored exceeds the size of the soft buffer; and
   storing the first data and the second data in the soft buffer according to the priority of the first data and the second data.

2. The method according to claim 1,
   wherein the method further comprises configuring a dedicated soft buffer for the first data of the D2D communication, and
   wherein the storing comprises storing the soft bits of the first data in the dedicated soft buffer for the first data.

3. The method according to claim 1,
   wherein the method further comprises:
   receiving signaling from a base station; and
   acquiring information about a size of a soft buffer for the first data and information about the size of the soft buffer for the terminal, and
   wherein the storing comprises storing, according to the information about the size of the soft buffer for the first data, soft bits of the first data in a part of a corresponding size of the soft buffer for the terminal, and storing soft bits of the second data in a remaining part of the soft buffer for the terminal.

4. The method according to claim 2,
   wherein the storing the soft bits of the first data comprises:
   for each D2D subframe, storing soft bits $W_k, W_{k+1}, \ldots, W_{mod(k+n_{SB}-1, N_{cb})}$ at least for each code block of one transport block, where:

$$n_{SB} = \left\lfloor \frac{N_{soft\_D2D}}{C \cdot \min(L, M_{limit})} \right\rfloor \text{ or } n_{SB} = \left\lfloor \frac{N_{soft\_D2D}}{C \cdot L} \right\rfloor;$$

$$N_{cb} = \min\left(\left\lfloor \frac{N_{IR}}{C} \right\rfloor, K_w\right);$$

$$N_{IR} = \left\lfloor \frac{N_{soft\_D2D}}{\min(L, M_{limit})} \right\rfloor \text{ or } N_{IR} = \left\lfloor \frac{N_{soft\_D2D}}{L} \right\rfloor;$$

$N_{soft\_D2D}$ is information about a size of a soft buffer for the first data shared by D2D processes of retransmission mode configured within one merging cycle;

C is a total number of code blocks divided from a transport block;

$M_{limit}$ is a constant 8;

$K_w$ is a total number of code bits output by turbo coding; and

L is a number of the D2D processes of retransmission mode configured within one merging cycle.

5. The method according to claim 2, wherein the storing the soft bits of the first data comprises:

for each D2D subframe, storing soft bits $w_k w_{k+1}, \ldots, W_{mod(k+n_{SB}-1, N_{cb})}$ at least for each code block of one transport block, where:

$$n_{SB} = \left\lfloor \frac{N_{soft\_D2D}}{C} \right\rfloor;$$

$$N_{cb} = \min\left(\left\lfloor \frac{N_{IR}}{C} \right\rfloor, K_w\right);$$

$$N_{IR} = N_{soft\_D2D};$$

$N_{soft\_D2D}$ is information about a size of a soft buffer for the first data used by a single D2D process of retransmission mode;
C is a total number of code blocks divided from a transport block;
$M_{limit}$ is a constant 8; and
$K_w$ is a total number of code bits output by turbo coding.

6. The method according to claim 3, wherein the storing soft bits of the second data in the remaining part of the soft buffer for the terminal comprises:
for each carrier configured for the terminal, storing, when one code block of one transport block fails to be decoded, soft bits $w_k\ w_{k+1}, \ldots, W_{mod(k+n_{SB}-1, N_{cb})}$ at least for this code block in the remaining part of the soft buffer for the terminal, where:

$$n_{SB} = \min\left(N_{cb}, \left\lfloor \frac{N_{soft} - N_{soft\_D2D}}{C \cdot N_{cells}^{DL} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft} - N_{soft\_D2D}}{K_c \cdot K_{MIMO} \cdot \min(M_{DL\_HARQ}, M_{limit})} \right\rfloor \text{ or }$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about the size of the soft buffer for the terminal;
$N_{soft\_D2D}$ is information about the size of the soft buffer for the first data shared by D2D processes of retransmission mode configured within one merging cycle;
C is a total number of code blocks divided from a transport block;
$N_{cells}^{DL}$ is a number of carriers configured for the terminal;
for a MIMO transmission mode, $K_{MIMO}=2$, while for a non-MIMO transmission mode, $K_{MIMO}=1$;
$M_{DL\_HARQ}$ is a maximum number of downlink HARQ processes determined according to a TDD uplink/downlink configuration of the terminal;
$M_{limit}$ is a constant 8;
$K_w$ is a total number of code bits output by turbo coding; and
$w_k$ is one soft bit received by the terminal, and k is a smallest index among indexes of the soft bits received by the terminal.

7. The method according to claim 3, wherein the storing soft bits of the second data in the remaining part of the soft buffer for the terminal comprises:
for each carrier configured for the terminal, storing, when one code block of one transport block fails to be decoded, soft bits $w_k\ w_{k+1}, \ldots, w_{mod(k+n_{SB}-1, N_{cb})}$ at least for this code block in the remaining part of the soft buffer for the terminal, where:

$$n_{SB} = \min\left(N_{cb}, \left\lfloor \frac{N_{soft} - L * N_{soft\_D2D}}{C \cdot N_{cells}^{DL} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft} - L * N_{soft\_D2D}}{K_c \cdot K_{MIMO} \cdot \min(M_{DL\_HARQ}, M_{limit})} \right\rfloor \text{ or }$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about the size of the soft buffer for the terminal;
$N_{soft\_D2D}$ is information about the size of the soft buffer for the first data used by a single D2D process of retransmission mode;
L is a number of the D2D processes of retransmission mode configured within one merging cycle;
C is a total number of code blocks divided from a transport block;
$N_{cells}^{DL}$ is a number of carriers configured for the terminal;
for a MIMO transmission mode, $K_{MIMO}=2$, while for a non-MIMO transmission mode, $K_{MIMO}=1$;
$M_{DL\_HARQ}$ is a maximum number of downlink HARQ processes determined according to a TDD uplink/downlink configuration of the terminal;
$M_{limit}$ is a constant 8;
$K_W$ is a total number of code bits output by turbo coding;
$w_k$ is one soft bit received by the terminal, and k is a smallest index among indexes of the soft bits received by the terminal; and
wherein a determination method of $K_c$ is as follows: if $N_{soft}=35982720$, $K_c=5$; if $N_{soft}=3654144$ and when UE cannot support more than two layers of spatial multiplexing when being in a downlink, $K_c=2$; and, in other cases, $K_c=1$.

8. The method according to claim 1,
wherein the method further comprises:
receiving signaling from a base station; and
acquiring information about the size of the soft buffer for the terminal.

9. The method according to claim 8, wherein the storing comprises:
for each carrier configured for the terminal, storing, by the terminal, when one code block of one transport block fails to be decoded, soft bits $W_k W_{k+1}, \ldots, W_{mod(k+n_{SB}-1, N_{cb})}$ at least for this code block, where:

$$n_{SB} = \min\left(N_{cb}, \left\lfloor \frac{N_{soft}}{C \cdot N_{cells}^{DL} \cdot K_{MIMO} \cdot \min(M'_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M'_{DL\_HARQ}, M_{limit})} \right\rfloor \text{ or }$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about the size of the soft buffer for the terminal;

C is a total number of code blocks divided from a transport block;

$N_{cells}^{DL}$ is a number of carriers configured for the terminal;

for a MIMO transmission mode, $K_{MIMO}=2$, while for a non-MIMO transmission mode, $K_{MIMO}=1$;

$M_{DL\_HARQ}$ is a maximum number of downlink HARQ processes determined according to a TDD uplink/downlink configuration of the terminal;

$M'_{DL\_HARQ}$ is a sum of $M_{DL\_HARQ}$ and L;

L is a number of the D2D processes of retransmission mode configured within one merging cycle;

$M_{limit}$ is a constant 8;

$K_W$ is a total number of code bits output by turbo coding;

$w_k$ is one soft bit received by the terminal, and k is a smallest index among indexes of the soft bits received by the terminal; and wherein a determination method of $K_c$ is as follows: if $N_{soft}=35982720$, $K_c=5$; if $N_{soft}=3654144$ and when terminal cannot support more than two layers of spatial multiplexing when being in a downlink, $K_c=2$; and, in other cases, $K_c=1$.

10. The method according to claim 1, wherein the storing comprises:

for each carrier configured for the terminal, storing, by the terminal, when one code block of one transport block fails to be decoded, soft bits $W_k W_{k+1}, \ldots, W_{mod(k+n_{SB}-1,N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about a size of a soft buffer for the terminal;

C is a total number of code blocks divided from a transport block;

$N'^{DL}_{cells}=N^{DL}_{cells}+N_{D2D}$, where $N^{DL}_{cells}$ is a number of carriers configured for the terminal, and $N_{D2D}$ is a number of cells configured with D2D subframes;

for a MIMO transmission mode, $K_{MIMO}=2$, while for a non-MIMO transmission mode, $K_{MIMO}=1$;

$M_{DL\_HARQ}$ is equal to 8;

$M_{limit}$ is a constant 8;

$K_W$ is a total number of code bits output by turbo coding;

$w_k$ is one soft bit received by the terminal, and k is a smallest index among indexes of the soft bits received by the terminal; and a determination method of $K_c$ is as follows: if $N_{soft}=35982720$, $K_c=5$; if $N_{soft}=3654144$ and when the terminal cannot support more than two layers of spatial multiplexing when being in a downlink, $K_c=2$; and, in other cases, $K_c=1$.

11. The method according to claim 8, wherein:

the first data comprises D2D discovery information, Scheduling Assignment (SA) for scheduling D2D communication, D2D communication data of public safety and D2D communication data of non-public safety;

the storing comprises storing soft bits of the second data and first data based on a priority of storage of the soft bits, from a highest priority to a lowest priority:

PDSCH data, SA for scheduling D2D communication, D2D communication data of public safety, D2D communication data of non-public safety, D2D discovery information;

or, PDSCH data, D2D communication data of public safety, SA for scheduling D2D communication, D2D communication data of non-public safety, D2D discovery information;

or, SA for scheduling D2D communication, PDSCH data, D2D communication data of public safety, D2D communication data of non-public safety, D2D discovery information;

or, SA for scheduling D2D communication, D2D communication data of public safety, PDSCH data, D2D communication data of non-public safety, D2D discovery information;

or, D2D communication data of public safety, PDSCH data, SA for scheduling D2D communication, D2D communication data of non-public safety, D2D discovery information;

or, D2D communication data of public safety, SA for scheduling D2D communication, PDSCH data, D2D communication data of non-public safety, D2D discovery information.

12. The method according to claim 11, wherein:

if there are any soft bits of data in the soft buffer with a priority lower than that of the data to be stored and an unoccupied soft buffer is smaller than the soft bits of the data to be stored, the soft bits stored in the soft buffer are released from the lowest priority to the highest priority until there is no soft bit of data in the soft buffer with the priority lower than that of the data to be stored or until the unoccupied soft buffer is larger than or equal to the soft bits of the data to be stored.

13. The method according to claim 11, wherein:

the second data, the D2D communication data of public safety and the D2D communication data of non-public safety are stored in soft buffer units divided from the soft buffer, a size of each soft buffer unit being $$\left(\left\lfloor \frac{N_{soft}}{N^{DL}_{cells} \cdot K_{MIMO} \cdot \min(M_{DL\_HARQ}, M_{limit})} \right\rfloor\right),$$

where, $N_{soft}$ is information about the size of the soft buffer for the terminal;

$N_{cells}^{DL}$ is a number of carriers configured for the terminal; for a MIMO transmission mode, $K_{MIMO}=2$, while for a non-MIMO transmission mode, $K_{MIMO}=1$;

for a TDD serving cell, $M_{DL\_HARQ}$ is a maximum number of downlink HARQ processes determined according to a TDD uplink/downlink configuration of the terminal, while for an FDD serving cell, $M_{DL\_HARQ}$ is equal to 8;

$M_{limit}$ is a constant 8;

the D2D discovery information is stored in a soft buffer sub-unit of a first type divided from the soft buffer unit, a size of the soft buffer sub-unit of the first type being 256 * t bits; and the SA for scheduling D2D communication is stored in the soft buffer sub-unit of the first type or in a soft buffer sub-unit of a second type divided from the soft buffer unit, a size of the soft buffer sub-unit of the second type being determined upon a bandwidth of a carrier transmitting the first data.

14. The method according to claim 1,
wherein the method further comprises:
receiving signaling from a base station; and
acquiring information about the size of the soft buffer for the terminal, and
wherein the storing comprises storing, according to a duplex mode of a cell where the terminal is located and a type of D2D, the soft bits of the first data and soft bits of the second data in the soft buffer for the terminal.

15. The method according to claim 14, wherein:
if the duplex mode of the cell where the terminal is located is frequency division duplex and the type of the D2D is D2D communication, the storing comprises:
for each carrier configured for the terminal, storing, by the terminal, when one code block of one transport block fails to be decoded, soft bits $w_k w_{k+1}, \ldots, W_{mod(k+n_{SB}-1, N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about the size of the soft buffer for the terminal;
C is a total number of code blocks divided from a transport block;
$N'^{DL}_{cells} = N^{DL}_{cells} + N_{D2D}$, where $N^{DL}_{cells}$ is a number of carriers configured for the terminal, and $N_{D2D}$ is a number of cells configured with D2D subframes;
for a MIMO transmission mode, $K_{MIMO}=2$, while for a non-MIMO transmission mode, $K_{MIMO}=1$;
$M_{DL\_HARQ}$ is equal to 8;
$M_{limit}$ is a constant 8;
$K_W$ is a total number of code bits output by turbo coding;
$w_k$ is one soft bit received by the terminal, and k is a smallest index among indexes of the soft bits received by the terminal; and
a determination method of $K_c$ is as follows: if $N_{soft}=35982720$, $K_c=5$; if $N_{soft}=3654144$ and when UE cannot support more than two layers of spatial multiplexing when being in a downlink, $K_c=2$; and, in other cases, $K_c=1$;
if the duplex mode of the cell is frequency division duplex and the type of the D2D is D2D communication, the storing comprises:
for a cell configured with D2D subframes, by the terminal, when one code block of one transport block fails to be decoded for a cell configured with D2D subframes, storing, by the terminal, when one code block of one transport block fails to be decoded, soft bits $W_k W_{k+1}, \ldots, W_{mod(k+n_{SB}-1, N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about the size of the soft buffer for the terminal;
C is a total number of code blocks divided from a transport block;
$N'^{DL}_{cells} = N^{DL}_{cells} + N_{D2D}$, where $N^{DL}_{cells}$ is a number of carriers configured for the terminal, and $N_{D2D}$ is a number of cells configured with D2D subframes;
for a MIMO transmission mode, $K_{MIMO}=2$, while for a non-MIMO transmission mode, $K_{MIMO}=1$;
$M_{DL\_HARQ}$ is equal to 8;
$M_{limit}$ is a constant 8;
$K_W$ is a total number of code bits output by turbo coding;
$w_k$ is one soft bit received by the terminal, and k is the smallest index among indexes of the soft bits received by the terminal; and
a determination method of $K_c$ is as follows: if $N_{soft}=35982720$, $K_c=5$; if $N_{soft}=3654144$ and when the terminal cannot support more than two layers of spatial multiplexing when being in a downlink, $K_c=2$; and, in other cases, $K_c=1$.

16. The method according to claim 14, wherein
if the duplex mode of the cell where the terminal is located is frequency division duplex and the type of the D2D is D2D discovery, the storing comprises:
for each carrier configured for the terminal, storing, by the terminal, when one code block of one transport block fails to be decoded, soft bits $W_k W_{k+1}, \ldots, W_{mod(k+n_{SB}-1, N_{cb})}$ at least for this code block, where:

$$n_{SB} = \min\left(N_{cb}, \left\lfloor \frac{N_{soft}}{C \cdot N'^{DL}_{cells} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about the size of the soft buffer for the terminal;
C is a total number of code blocks divided from a transport block;
$N'^{DL}_{cells} = N^{DL}_{cells} + N_{D2D}$, where $N^{DL}_{cells}$ is a number of carriers configured for the terminal, and $N_{D2D}$ is a number of cells configured with D2D subframes;
for a MIMO transmission mode, $K_{MIMO}=2$, while for a non-MIMO transmission mode, $K_{MIMO}=1$;
$M_{DL\_HARQ}$ is equal to 8;
$M_{limit}$ is a constant 8;
$K_W$ is a total number of code bits output by turbo coding;
$w_k$ is one soft bit received by the terminal, and k is a smallest index among indexes of the soft bits received by the terminal; and
wherein a determination method of $K_c$ is as follows: if $N_{soft}=35982720$, $K_c=5$; if $N_{soft}=3654144$ and when the terminal cannot support more than two layers of spatial multiplexing when being in a downlink, $K_c=2$; and, in other cases, $K_c=1$.

17. The method according to claim 16, wherein:
when a number of soft bits of the second data to be stored and a number of soft bits of D2D discovery to be stored exceed the size of the soft buffer for the terminal, the storing comprises:

storing the soft bits of the D2D discovery until the soft bits of the D2D discovery to be stored is stored, and then the second data;

storing the second data until the second data at least to be stored is stored, and then the soft bits of the D2D discovery; or determining a method for storing the soft bits of the second data and the soft bits of the D2D discovery.

18. The method according to claim 14, wherein:

if the duplex mode of the cell where the terminal is located is frequency division duplex and the type of the D2D is D2D discovery or D2D communication, the storing soft bits of the second data comprises:

for each carrier configured for the terminal, storing, by the terminal, when one code block of one transport block fails to be decoded, soft bits $W_k W_{k+1}, \ldots, W_{mod(k+n_{SB}-1, N_{cb})}$ at least for this code block, where:

$$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right);$$

$$N_{cb} = \min\left(\left\lfloor \frac{N_{IR}}{C} \right\rfloor, K_w\right);$$

$$N_{IR} = \left\lfloor \frac{N_{soft}}{K_c \cdot K_{MIMO} \cdot \min(M_{DL\_HARQ}, M_{limit})} \right\rfloor;$$

$N_{soft}$ is information about the size of the soft buffer for the terminal;

C is a total number of code blocks divided from a transport block;

$N_{cells}^{DL}$ is a number of carriers configured for the terminal;

for a MIMO transmission mode, $K_{MIMO}=2$, while for a non-MIMO transmission mode, $K_{MIMO}=1$;

$M_{DL\_HARQ}$ is a maximum number of downlink HARQ processes determined according to a TDD uplink/downlink configuration of the terminal; or, if the TDD uplink/downlink configuration of the cell where the terminal is located is 2, 3, 4 and 5, $M_{DL\_HARQ}$ is a maximum number of downlink HARQ processes determined according to the TDD uplink/downlink configuration of the terminal; and if the TDD uplink/downlink configuration of the cell where the terminal is located is 0, 1 and 6, $M_{DL\_HARQ}$ is configured by high-level signaling or $M_{DL\_HARQ}$ is equal to 8;

$M_{limit}$ is a constant 8;

$K_w$ is a total number of code bits output by turbo coding;

$w_k$ is one soft bit received by the terminal, and k is a smallest index among indexes of the soft bits received by the terminal; and wherein a determination method of $K_c$ is as follows: if $N_{soft}=35982720$, $K_c=5$; if $N_{soft}=3654144$ and when the terminal cannot support more than two layers of spatial multiplexing when being in a downlink, $K_c=2$; and, in other cases, $K_c=1$.

19. The method according to claim 18, wherein:

when a number of soft bits of the second data to be stored or a number of soft bits of D2D discovery or D2D communication to be stored exceed the size of the soft buffer for the terminal, the storing comprises:

storing the soft bits of the D2D discovery or D2D communication until the soft bits of the D2D discovery or D2D communication to be stored is stored, and then the second data;

storing the second data until the second data at least to be stored is stored, and then the soft bits of the D2D discovery or D2D communication; or determining a method for storing the soft bits of the second data and the soft bits of the D2D discovery or D2D communication.

20. A terminal for processing a soft buffer, comprising:

a receiving module; and a soft buffer processing module, wherein the receiving module is configured to receive a first data of a device-to-device (D2D) communication and a second data of a downlink transmission on a physical downlink shared channel (PDSCH), and wherein the soft buffer processing module is configured to:

identify whether a soft bit to be stored of the first data and the second data exceeds a size of a soft buffer, determine a priority for the first data and the second data, if the soft bit to be stored exceeds the size of the soft buffer, and store the first data and the second data in the soft buffer according to the priority of the first data and the second data.

* * * * *